US008509055B2

(12) United States Patent
Khan et al.

(10) Patent No.: US 8,509,055 B2
(45) Date of Patent: Aug. 13, 2013

(54) SYSTEMS AND METHODS FOR ABSOLUTE ROUTE DIVERSITY FOR MESH RESTORABLE CONNECTIONS

(75) Inventors: Waseem Reyaz Khan, New Delhi (IN); Vagish Madrahalli, Woodstock, GA (US)

(73) Assignee: Ciena Corporatin, Hanover, MD (US)

( * ) Notice: Subject to any disclaimer, the term of this patent is extended or adjusted under 35 U.S.C. 154(b) by 907 days.

(21) Appl. No.: 12/329,746

(22) Filed: Dec. 8, 2008

(65) Prior Publication Data
US 2010/0104282 A1 Apr. 29, 2010

(30) Foreign Application Priority Data

Oct. 23, 2008 (IN) .......................... 2411/DEL/2008

(51) Int. Cl.
*H04L 12/26* (2006.01)
*H04L 12/28* (2006.01)
*G02F 1/00* (2006.01)
*G06F 15/173* (2006.01)

(52) U.S. Cl.
USPC ................ 370/216; 370/254; 398/1; 709/239

(58) Field of Classification Search
None
See application file for complete search history.

(56) References Cited

U.S. PATENT DOCUMENTS

| | | | |
|---|---|---|---|
| 6,968,130 B1 * | 11/2005 | Pan ................................ 398/5 |
| 7,298,971 B2 * | 11/2007 | Norman ........................ 398/12 |
| 7,391,720 B1 * | 6/2008 | Kuditipudi et al. ........... 370/225 |
| 7,490,165 B1 * | 2/2009 | Katukam et al. .............. 709/239 |
| 7,542,414 B1 * | 6/2009 | Katukam ....................... 370/223 |
| 2003/0117950 A1 * | 6/2003 | Huang ........................... 370/220 |
| 2004/0022279 A1 * | 2/2004 | Kailbach et al. ............. 370/542 |
| 2004/0103210 A1 * | 5/2004 | Fujii et al. ..................... 709/239 |
| 2004/0109683 A1 * | 6/2004 | Mistry et al. ...................... 398/5 |
| 2004/0190444 A1 * | 9/2004 | Trudel et al. .................. 370/224 |
| 2004/0208118 A1 * | 10/2004 | DeBoer et al. ................ 370/223 |
| 2005/0013241 A1 * | 1/2005 | Beller et al. ................... 370/216 |
| 2008/0130677 A1 * | 6/2008 | Attarwala et al. ............. 370/458 |
| 2008/0212497 A1 * | 9/2008 | Getachew et al. ............ 370/256 |
| 2009/0003192 A1 * | 1/2009 | Martinotti et al. ............ 370/216 |
| 2011/0122765 A1 * | 5/2011 | Caviglia et al. ............... 370/225 |

\* cited by examiner

*Primary Examiner* — Timothy J Weidner
(74) *Attorney, Agent, or Firm* — Clements Bernard PLLC; Christopher L. Bernard; Lawrence A. Baratta, Jr.

(57) ABSTRACT

The present disclosure provides absolute route diversity (ARD) for mesh restorable sub-network connection protection (MR-SNCP) services. ARD addresses concerns in MR-SNCP by providing absolute path diversity between both paths (e.g., peer Sub Network Connections (SNCs)) of an MR-SNCP connection. If an ARD condition is not met, the peer SNC is not mesh restored and the MR-SNCP works with just one single SNC. The advantage of this approach is to reuse the bandwidth saved from ARD for other MR-SNCP, i.e. more efficient bandwidth utilization due to ARD for other MR-SNCPs, and better service quality guarantee (protection) in terms of planning and managing the network bandwidth.

20 Claims, 16 Drawing Sheets

FIG. 16

SYSTEMS AND METHODS FOR ABSOLUTE ROUTE DIVERSITY FOR MESH RESTORABLE CONNECTIONS

CROSS-REFERENCE TO RELATED APPLICATION(S)

The present non-provisional patent claims the benefit of priority of co-pending Indian Patent Application No. 2411/DEL/2008, filed on Oct. 23, 2008, and entitled "SYSTEMS AND METHODS FOR ABSOLUTE ROUTE DIVERSITY FOR MESH RESTORABLE CONNECTIONS," the contents of which are incorporated in full by reference herein.

FIELD OF THE INVENTION

The present invention relates generally to communication networks. More particularly, the present invention provides systems and methods for absolute route diversity (ARD) with mesh restorable sub-network connection protection (MR-SNCP) services in optical switches utilizing optical control planes, such as Optical Signal and Routing Protocol (OSRP), Automatically Switched Optical Network (ASON), Generalized Multi-Protocol Label Switching (GMPLS), and the like.

BACKGROUND OF THE INVENTION

Sub-network connection protection (SNCP) is a path protection mechanism defined in ITU-T G.841, "Types and characteristics of SDH network protection architectures," which is similar to unidirectional path switched rings (UPSR) in the SONET standard. SNCP utilizes a permanent source bridge on an ingress port, and a selector function at an egress port. SNCPs are unidirectional and switching is performed similarly to a 1+1 and UPSR protection mechanisms. SNCP services are 1+1 protected services that provide protection in a network in the presence of one failure, with minimal traffic-impacting switching ability.

Referring to FIG. 1, in a network 100 with a SNCP service, two paths 102, 104 (also referred to as legs) are provisioned through the network 100. The network 100 can include multiple switches 106 including an ingress switch 106a and an egress switch 106b. The switches 106 can include optical switches operating SONET, SDH, Optical Transport Network (OTN), or the like along with a control plane including a signal and routing protocol, such as Optical Signal and Routing Protocol (OSRP) or the like. Both the paths 102, 104 carry the same traffic stream, and a select function is used to select one of the two streams. In case of a failure of an active stream, a simple switch at the egress switch 106b, a device attached to the egress switch 106b, or the like is able to protect the service. Advantageously, the SNCP service experiences smaller down time as compared to other protection schemes such as a full mesh restoration on an ordinary sub-network connection (SNC) service.

In general, the ability to provide SNCP protection does not rely on the network's 100 structure, i.e. it does not depend on the existence of rings for line switched ring (LSR) protection or with duplicate equipment for APS/MSP protection. The ability to provide SNCP protection does depend on the ability to establish the two paths 102, 104 through the network 100 such that they are fully disjoint from the point of view of failure points—so that no single failure can affect both paths 102, 104 at the same time. For example, in a mesh network of optical switches, availability of single-failure disjoint paths generally translates into OSRP Bundle ID diversity.

While SNCP services in general are resilient to single failures, they may not be resilient to dual failures that affect the two paths 102, 104 of the service. The introduction of Mesh Restorable SNCP (MR-SNCP) services aims at providing services that are potentially resilient to dual failures, as long as failure-disjoint paths can be established through the network post-failure.

Referring to FIG. 2, the network 100 includes a MR-SNCP on the two paths 102, 104. In a MR-SNCP, the occurrence of a failure 206 is protected in the same way as an ordinary SNCP service, i.e. through a selection switch at the egress switch 106b. Unlikely previous SNCP services, the path 102 that is affected by the failure 206 attempts protection or mesh restoration in the same way as an ordinary SNC, such as possible protect switching and local span mesh restoration (LSMR). For example, the path 102 is rerouted to a path 202 upon the occurrence of the failure 206, providing redundancy for the MR-SNCP service. Advantageously, upon occurrence of a second failure 208, the MR-SNCP service can still be protected through a selection switch. Moreover, additional failures can keep being protected through a selection switch as long as the path 104 that was affected by the most recent failure 208 can migrate to a path 204 that is failure-disjoint from the currently active path. Notice that resiliency to dual failures is not assured solely by the introduction of the MR-SNCP feature, but it requires some degree of diversity in the network layout itself.

When network failures impact both working and protection paths 102, 104, both paths 102, 104 need to be restored onto additional bandwidth. Disadvantageously, this can cause bandwidth contention among multiple circuits, lack of absolute route diversity between paths, lower priority circuits hogging bandwidth and blocking mesh restoration of higher priority circuits, and the like. Existing MR-SNCP services suffer with a problem that moving a peer path to a new path could overlap with the existing home path or current path of the peer SNC. The reason for such a behavior is due to treating the other path's current and home path as preferred exclusive path and not as mutual exclusive path. This leads to both the MR-SNCP legs double booking some of the same links or bundles under such conditions. In such scenarios, a single failure can lead both the paths to go down and there is no protection switch guaranteed at that time.

Currently there is no support for the above shortcomings in any customer-deployed network

BRIEF SUMMARY OF THE INVENTION

In various exemplary embodiments, the present invention provides absolute route diversity (ARD) for MR-SNCP connections. ARD addresses concerns in MR-SNCP by providing absolute path diversity between both paths (legs) of an MR-SNCP connection. If an ARD condition is not met, the peer SNC is not mesh restored and the MR-SNCP works with just one single SNC. The advantage of this approach is to reuse the bandwidth saved from ARD for other MR-SNCPs, i.e. more efficient bandwidth utilization due to ARD for other MR-SNCPs, and better service quality guarantee (protection) in terms of planning and managing the network bandwidth.

In an exemplary embodiment of the present invention, a switch configured to provide Absolute Route Diversity for Mesh Restorable connections includes one or more line interfaces; a control module configured to operate a control plane and to control the one or more line interfaces; and a Mesh Restorable Sub Network Connection Protection service with a first leg and a second leg, wherein the Mesh Restorable Sub Network Connection Protection service is provided through the one or more line interfaces; wherein the control module ensures Absolute Route Diversity for each of the first leg and the second leg. The control module ensures Absolute Route Diversity for each of the first leg and the second leg during any of provisioning, mesh restoration, regrooming, reversion, and switch to protect. The switch can further include Absolute Route Diversity validation logic configured to determine if a path for the first leg is bundle and link diverse from the second leg. Responsive to the Absolute Route Diversity validation logic determining that the path is not diverse, the path is not setup and the Mesh Restorable Sub Network Connection Protection service is operated as a Sub Network Connection. The switch can further include Maximum Admin Weight validation logic configured to determine if the path meets a Maximum Admin Weight restriction. For the first leg, the Absolute Route Diversity validation logic is configured to ensure a path for the first leg avoids links that belong to a home path of the second leg and links that belong to a current path of the second leg. Optionally, the control plane includes any of Optical Signal and Routing Protocol (OSRP), Automatically Switched Optical Network (ASON), and Generalize Multi-Protocol Label Switching (GMPLS).

In another exemplary embodiment of the present invention, a method for providing Absolute Route Diversity for Mesh Restorable connections includes provisioning a Mesh Restorable Sub Network Connection Protection service with a first leg and a second leg; determining Absolute Route Diversity of a path for the first leg responsive to a trigger event; if Absolute Route Diversity is valid, setting up the path; and if Absolute Route Diversity is invalid, operating the second path as a Sub Network Connection. The trigger can include any of provisioning, mesh restoration, regrooming, reversion, and switch to protect. The method can further include enabling Absolute Route Diversity for the first leg. Optionally, the method further includes selecting a path for the first leg responsive to the trigger. Determining Absolute Route Diversity includes ensuring the path for the first leg avoids links that belong to a home path of the second leg and links that belong to a current path of the second leg. The method can further include ensuring the path meets a Maximum Admin Weight restriction. Optionally, the method further includes periodically checking for Absolute Route Diversity on the path; and reverting back to the Mesh Restorable Sub Network Connection Protection responsive to Absolute Route Diversity on the path. Optionally, the method further includes defining a Designated Transit List for the first leg; and defining a Designated Transit List for the second leg.

In yet another exemplary embodiment of the present invention, a network with Absolute Route Diversity for Mesh Restorable connections includes a plurality of nodes; a plurality of links interconnecting the plurality of nodes a control plane between the plurality of nodes; an ingress node of the plurality of nodes; an egress node of the plurality of nodes; a Mesh Restorable Sub Network Connection Protection service originating at the ingress node and terminating at the egress node, the Mesh Restorable Sub Network Connection Protection service with a first leg and a second leg, wherein the first leg and the second leg each diversely traverse the plurality of links; and Absolute Route Diversity validation logic configured to determine if a path for the first leg is bundle and link diverse from the second leg responsive to a trigger event. The trigger event can include any of provisioning, mesh restoration, regrooming, reversion, and switch to protect. The control plane is configured to control the trigger event; and responsive to the path lacking Absolute Route Diversity, the second leg operates as a Sub Network Connection with the first leg down. Optionally, the control plane includes any of Optical Signal and Routing Protocol (OSRP), Automatically Switched Optical Network (ASON), and Generalize Multi-Protocol Label Switching (GMPLS); and wherein the plurality of nodes each include an optical switch. The Absolute Route Diversity validation logic is configured to check if the path for the first leg avoids links that belong to a home path of the second leg and links that belong to a current path of the second leg.

BRIEF DESCRIPTION OF THE DRAWINGS

The present invention is illustrated and described herein with reference to the various drawings, in which like reference numbers denote like method steps and/or system components, respectively, and in which:

FIG. 16 is screen shot of a management graphical user interface (GUI) for an MR-SNCP service with ARD according to an exemplary embodiment of the present invention.

DETAILED DESCRIPTION OF THE INVENTION

In various exemplary embodiments, the present invention provides absolute route diversity (ARD) for MR-SNCP connections. Advantageously, ARD provides additional service class definitions and possible bandwidth savings in multiple failure scenarios. ARD addresses concerns in MR-SNCP by providing absolute path diversity between both paths of an MR-SNCP connection. If an ARD condition is not met, the peer SNC is not mesh restored and the MR-SNCP works with just one single SNC. The advantage of this approach is to reuse the bandwidth saved from ARD for other MR-SNCP, i.e. more efficient bandwidth utilization due to ARD for other MR-SNCPs, and better service quality guarantee (protection) in terms of planning and managing the network bandwidth.

Figure 1:
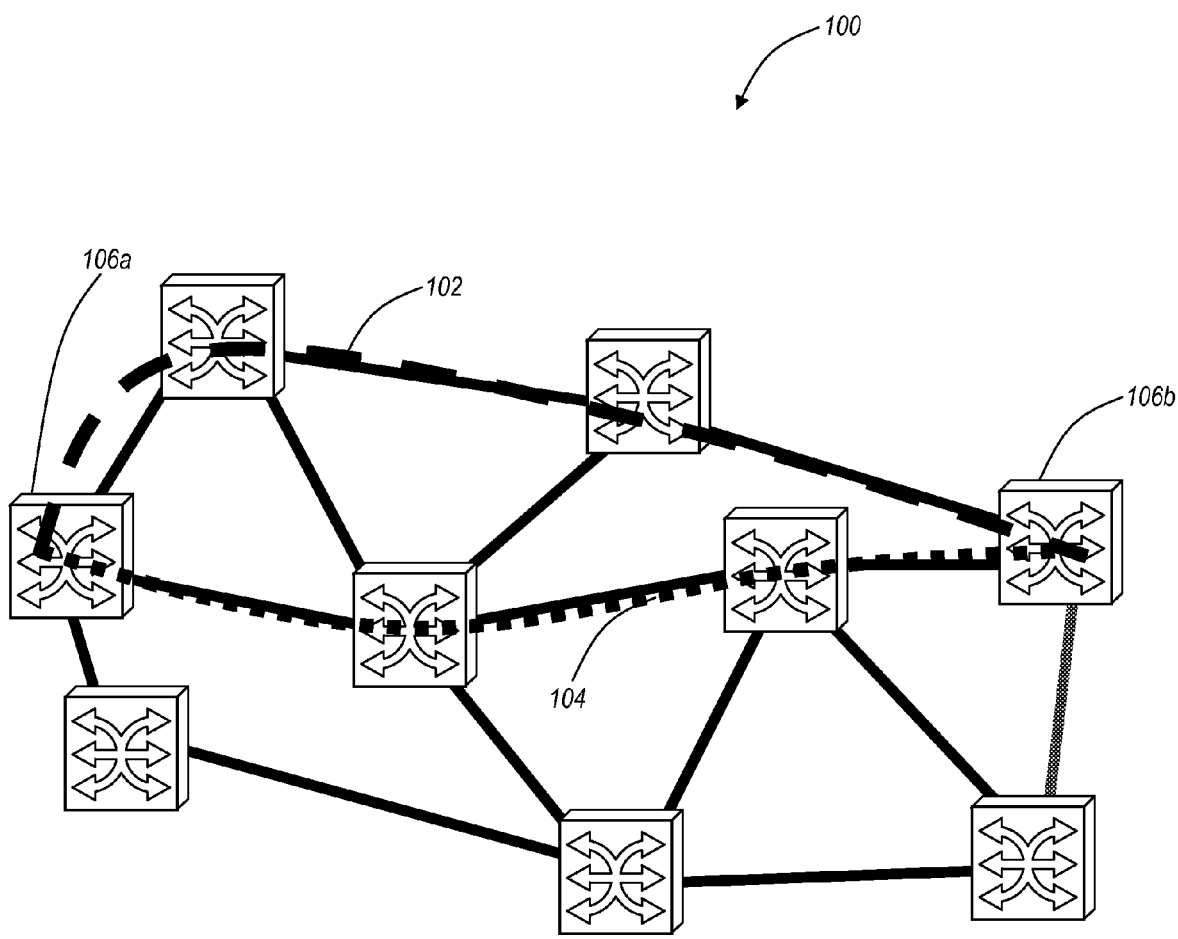
FIG. 1 is a diagram with two paths of a sub-network connection protection (SNCP) service provisioned through a network.
Figure 2:
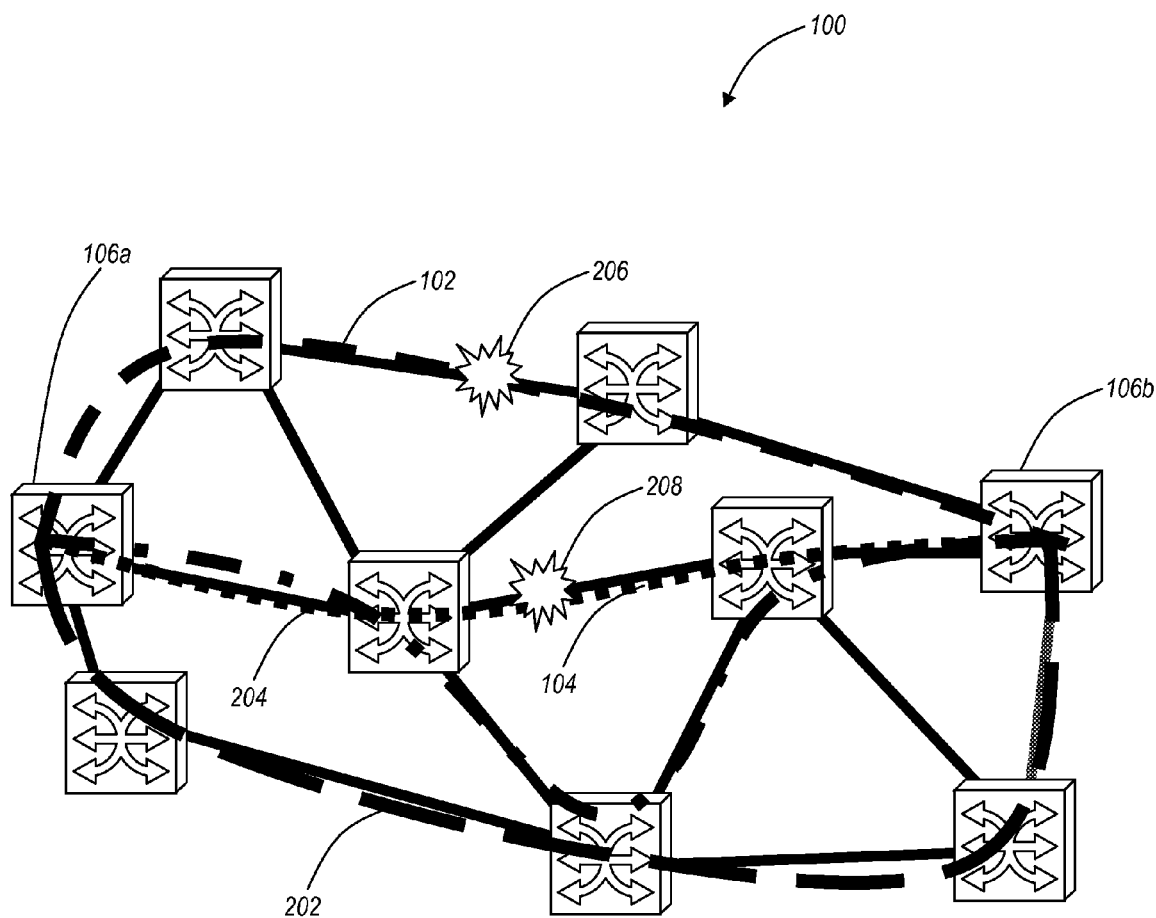
FIG. 2 is a diagram of the network in FIG. 1 with a mesh restorable SNCP (MR-SNCP) on the two paths.
Figure 3:
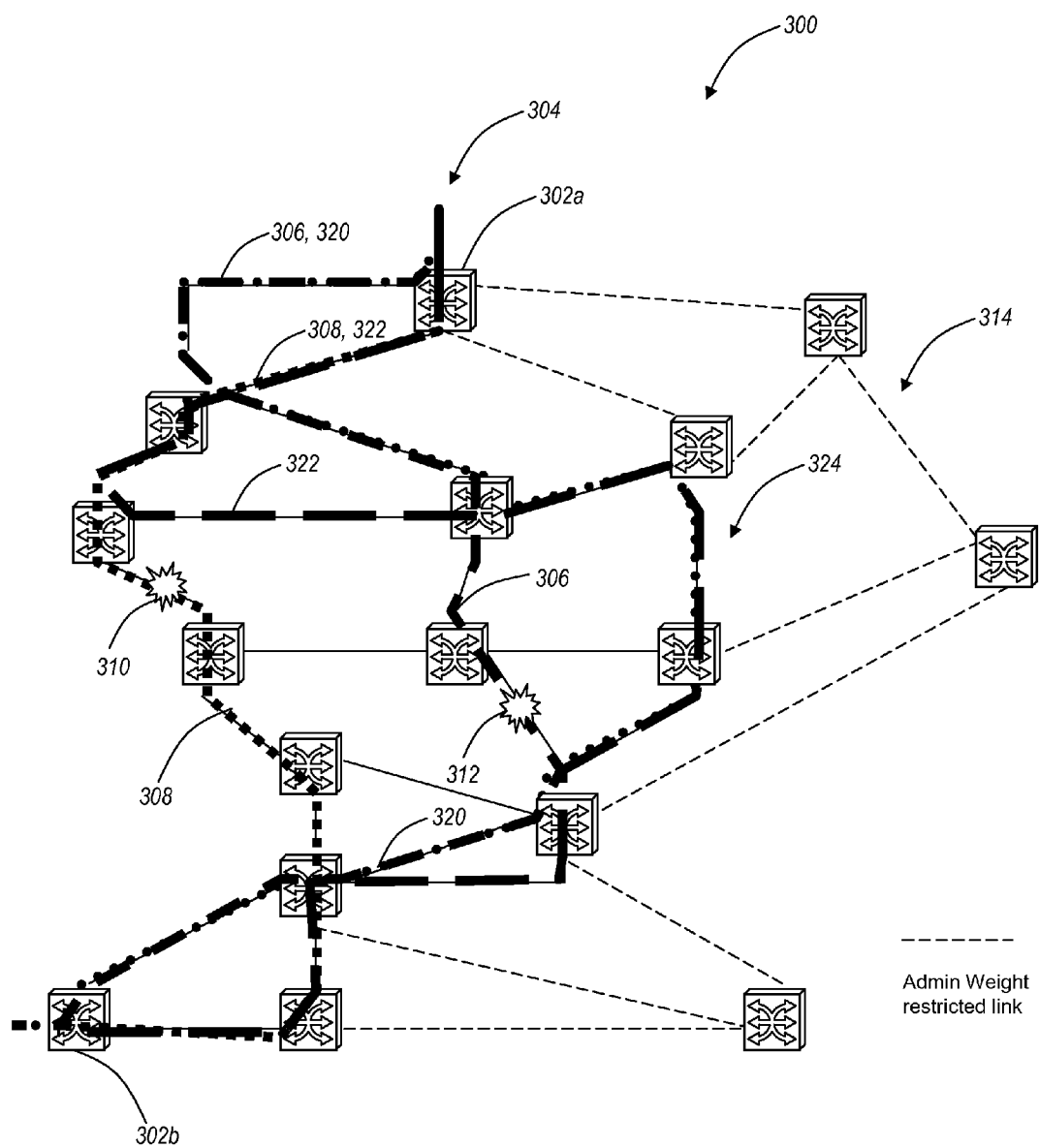
FIG. 3 is a diagram of a network of a plurality of interconnected nodes with absolute route diversity (ARD) on MR-SNCP connections according to an exemplary embodiment of the present invention.

Referring to FIG. 3, a network 300 of a plurality of interconnected nodes 302 illustrates ARD with MR-SNCP connections according to an exemplary embodiment of the present invention. The interconnected nodes 302 can include optical switches, cross-connects, etc., each including a switching component and multiple line interfaces to interconnect to other nodes 302. These interconnected nodes 302 can utilize a control plane for automatic resource discovery, distribution of network resource information, and establishment and restoration of connections dynamically across the network 300. For example, the control plane can include OSRP, Automatically Switched Optical Networks (ASON), Generalized Multi-Protocol Label Switching (G-MPLS), and the like.

In describing the exemplary embodiments herein, reference is made to OSRP paths, links, legs, and lines. OSRP is a distributed protocol designed for controlling a network of optical cross-connects (OXCs). OSRP introduces intelligence in the control plane of an optical transport system. It can perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

The network 300 includes a MR-SNCP connection 304 from an ingress node 302a to an egress node 302b. The MR-SNCP connection 304 includes two legs 306, 308, and each leg 306, 308 is equivalent to an SNC service that can mesh restore on a secondary path upon occurrence of a failure, possibly with the secondary path being as diverse as possible from the failing equipment and from the current path of the other leg. FIG. 3 illustrates two exemplary failures 310, 312 on each leg 306, 308, respectively. Also, the network 300 includes multiple nodes 302 with links 314 with an administrative weight that restricts these nodes from rerouting of the legs 306, 308.

OSRP provides route selection through a computation performed at the ingress node 302a. For example, route selection can be optimized using Dijkstra's Algorithm which can find a shortest path from the ingress nodes 302a to the egress node 302b through the network 300 based on a least administrative cost or weight, subject to a set of user-defined constraints. For example, routing considerations can include link capacity, connection type, line/path protection, restoration priority, explicit routes, maximum delay, reversion, connection preemption, transit delay, and the like. Ideally, in rerouting a failed leg in the MR-SNCP connection 304, a maximally disjoint route is chosen. However, due to maximum administrative weight restrictions, available bandwidth, and other routing constraints, working and protect legs may overlap in some segments after the failures 310, 312. For example, the leg 306 is mesh restored to a leg 320 following the failure 310, and the leg 308 is mesh restored to a leg 322 following the failure 312. However, the restored legs 320, 322 share common legs 324. When both the SNCP-MR legs 320, 322 double book the same common legs 324 or bundle, a single failure can lead both the legs 320, 322 to go down and there is no protection switch guaranteed at that time (i.e., SNCP switching is unavailable).

When an Absolute Route Diverse (ARD) path cannot be found for mesh restoring failed SNCP-MR leg, the ARD function of the present invention has the MR-SNCP circuit behave like a single SNC. For example, using ARD, the legs 306, 308 are treated as a single SNC from the ingress node 302a to the egress node 302b, i.e. the legs 306, 308 do not each mesh restore to the legs 320, 322. Instead, a single leg (i.e., either leg 320 or leg 322) is mesh restored as a single SNC circuit, e.g. only leg 322. The SNC circuit automatically reverts back from a linear SNC to SNCP as soon as the bundle diversity criteria along with restricted admin weight are met again in the network 300, or the original home path has recovered from failure.

ARD provides an absolute diversity path between both legs of the MR-SNCP connection. The aim of ARD is to prevent one peer SNC 'A' of a MR-SNCP to go occupy a new path that, together with peer SNC 'B', does not guarantee 50 milliseconds protection switch for all user-configured cases of protection bundle failures. Under ARD, the peer SNC 'A' of a MR-SNCP that is moving to a new path needs to avoid a set of protection bundle IDs that cover: Links that belong to the other peer SNC's (SNC 'B') home path; and links that belong to the other peer SNC's (SNC 'B') current path, if different from home path. If no route can be found that has absolutely no protection bundle ID in common with the set of bundle IDs to avoid, peer SNC 'A' remains down.

Figure 4:
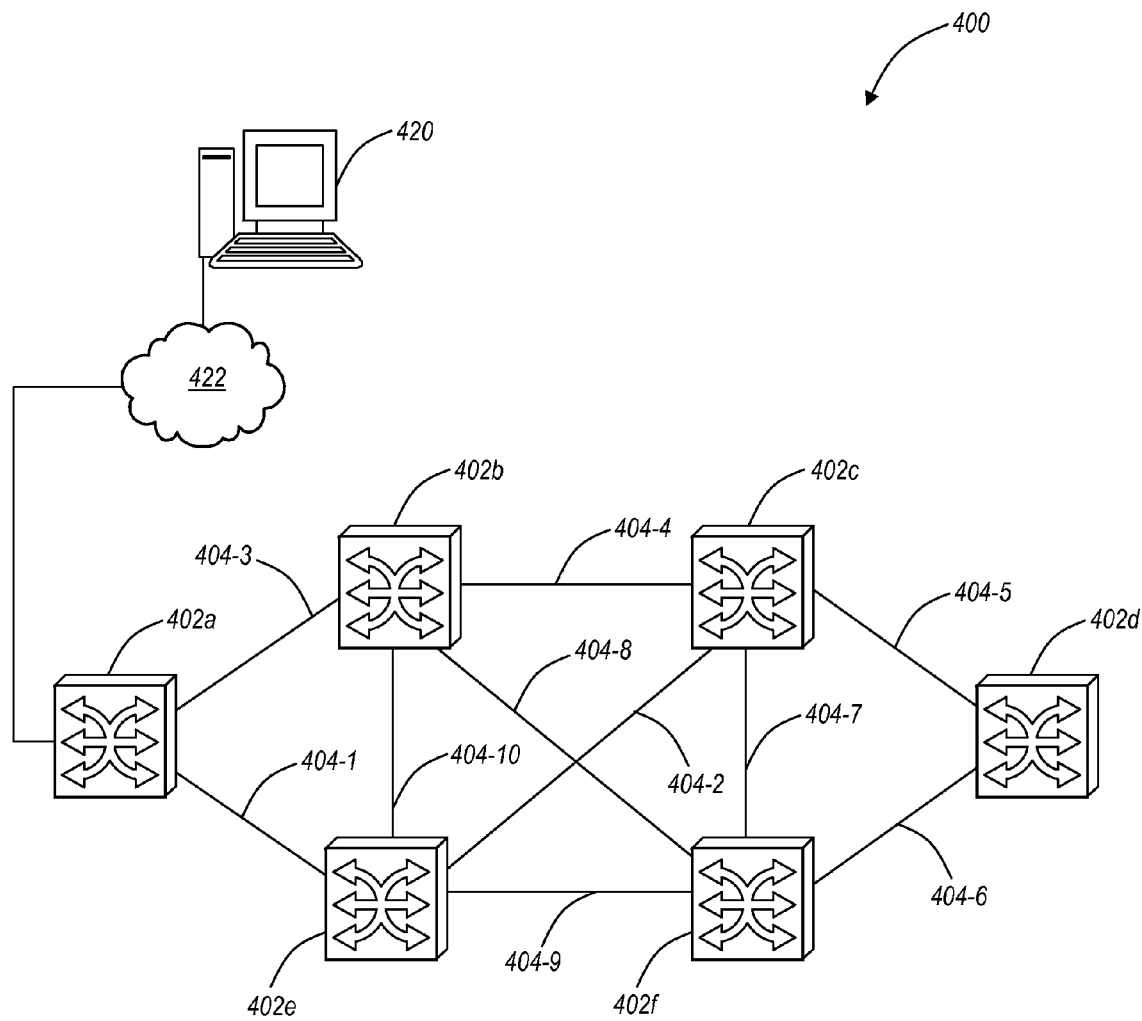
FIG. 4 is a diagram of another network of a plurality of interconnected nodes illustrating ARD according to an exemplary embodiment of the present invention.

Referring to FIG. 4, a network 400 with a plurality of interconnected nodes 402a-f illustrates ARD according to an exemplary embodiment of the present invention. The network 400 includes a plurality of links 404-1-404-10 interconnecting each of the nodes 402a-f. For illustrative purposes, node 402a is the originating node and 402d is the terminating node. The initial working designated transit list (DTL) for both legs of a SNCP-MR is exclusive by design, and once DTLs are validated by the Optical Routing Protocol (ORP), the nodes 402 validate them for Absolute Route Diversity in accordance with the behavior of the present invention.

For example, assume the configured Working DTL for both the legs of MR-SNCP includes a Working Path for the SNCP-MR working leg of {link 404-3, link 404-4, link 404-5} and a Working Path for the SNCP-MR protect leg of {link 404-1, link 404-10, link 404-8, link 404-6}. Assuming both the DTLs are valid and since both are Absolute Diverse (no link or bundle overlaps), both the legs come up on their working DTL and thus these DTLs are set as their Home DTL. If any of the link or bundle in these DTLs overlap, then as per ARD behavior in accordance with the present invention, ARD validation logic on the nodes 402 does not allow the second leg to come up and that particular MR-SNCP stays down with the first leg operating as a SNC.

Alternatively, assume the MR-SNCP working leg has already come up on the Working Path as mentioned above {link 404-3, link 404-4, link 404-5}, and if the MR-SNCP protect leg is chosen to use a Working Path as {link 404-1, link 404-2, link 404-7, link 404-5}, then due to an ARD validation logic failure (i.e., link 404-5 overlaps with the Working Path of MR-SNCP working leg), this leg does not come up.

Due to Mesh Restorable nature of the SNCs involved in the MR-SNCP, it is possible that due to any of the triggers, such as Regroom, Revert, Hard Failure, Switch To Protect, and the like, the failed or triggered leg tries to find an alternate path using ORP or a user provided DTL. At that point in time, ARD validation logic is used to get an absolute diversity path with respect to the other leg. For example, if in case of Hard Failure on working leg of SNCP {link 404-3, link 404-4, link 404-5}, the new DTL for working leg retrieved is {link 404-3, link 404-10, link 404-9, link 404}, the ARD validation logic does not allow this DTL because the link 404-10 overlaps with the Home DTL of the protect leg {link 404-1, link 404-10, link 404-8, link 404-6}. However, a new DTL for the working leg of {link 404-3, link 404-8, link 404-7, link 404-5} is okay for absolute route diversity (assuming the Hard failure is on the link 404-4, for example).

The ARD feature of the present invention applies to MR-SNCPs only, and only if the two peer SNCs of the MR-SNCP originate at the same node 402. The termination points of the two peer SNCs can be on the same node 402 or not, indifferently. ARD can apply to a MR-SNCP when both peer SNCs are mesh-restorable, but also when only one is mesh-restorable.

The restriction of finding a path that satisfies ARD is applied if a peer SNC of a MR-SNCP needs to find a new path as a result of one of the following: Provisioning, Mesh restoration, Regroom, Reversion (auto or manual), Switch to protect, and the like (for brevity, these are all referred to as ARD triggers). Due to any of the above ARD triggers on a MR-SNCP leg, ARD validation is applied on that leg (with Home and Current Working path of peer SNC). If ARD validation is passed, only then the leg comes up, else it remains down until it can get a path which is ARD compliant. During this period MR-SNCP works with only one leg as a SNC and the other leg can continuously try to get an ARD compliant path.

A management system 420 can connect to one or more of the nodes 402 through a data communication network (DCN) 422. For example, the management system 420 can include a network management system (NMS), element management system (EMS), craft interface (CI), nodal manager, or the like, and the management system 420 can be configured to provide operations, administration, maintenance, and provisioning (OAM&P) access to the nodes 402 and the network 400. The nodes 402 can communicate to one another through an in-band or out-of-band signaling mechanism, and accordingly the management system 420 can communicate with all the nodes 402.

A MR-SNCP service with the two legs originating on the same node can be provisioned through the management system 420. For example, the MR-SNCP service could utilize automatic provisioning (i.e., one-step provisioning) of a MR-SNCP service. The two home paths of the MR-SNCP can be calculated through the management system 420, the nodes 402, etc. The management system 420 can download the two home paths in the form of user-configured DTLs to the ingress node 402a and then create the MR-SNCP service. Among other attributes, each one of the two legs of the MR-SNCP service can be chosen as revertive or not, and a service class can be picked. Also, the MR-SNCP can be provisioned in a similar fashion as other SNCPs with the addition of specification of certain attributes for each leg of the service, independently. These specifications include: service class; Mesh restoration attributes, to control timing of the process; Reversion attributes, to control intra-leg reversion; Integrity Check attributes, and the like.

The two user-configured DTLs that are assigned to the MR-SNCP service can be used in a DTL-exclusive way to set up the two legs of the MR-SNCP service. DTL-exclusivity means that each leg attempts establishment on its given DTLs only. If either one of the two legs does not come up on the corresponding DTL, then the management system 420 considers the MR-SNCP service as not active. If an operator bypasses the management system 420 to establish the two legs of an MR-SNCP service, then it is the operator's responsibility to make sure they are both operative.

In the present invention, an operator (e.g., network administrator) can enable an ARD Enable flag attribute on individual SNCP-MR legs either during creation or anytime through a configure operation, such as through the management system 420. The default value of this attribute can be false. Enabling this attribute triggers ARD validation to take place during the next mesh activity (lock to unlock, hard failure, regroom, revert, switch to protect operations, etc.). This attribute applies only to MR-SNCPs and becomes applicable only if the two peer SNCs of the SNCP-MR originate at the same node 402. This attribute is persisted by the node 402 to recover from control plane failures. The operator can be given the ability to enable or disable ARD for each peer SNC of a MR-SNCP, independently.

The presence or absence of the ARD constraint on a peer SNC acts in conjunction with the presence or absence of a Max Admin Weight (MAW) restriction. When both restrictions are enabled, only paths that satisfy both restrictions can be attempted. In particular for automatically computed paths, only the lowest cost path that avoids all the protection bundles in the other peer SNC's home and current paths is going to be examined for MAW. The path can be attempted only if its total cost is smaller or equal to the MAW setting.

Any change in the ARD setting for a peer SNC has no immediate effects on the peer SNC. The new setting applies the next time an ARD trigger event occurs for the peer SNC, provided that the other peer SNC is up at that time. Once ARD is enabled on the existing SNC in a WORKING state (on which ARD is disabled), until the time ARD validation is applied on both the legs (due to any ARD trigger), ARD is not guaranteed for that MR-SNCP.

The management system 420 can provide enabling and disabling of ARD through a graphical user interface (GUI) checkbox. If a SNCP is enabled or a MR flag is disabled, then the management system 420 does not display this checkbox, i.e. the circuit is not a MR-SNCP. The management system 420 can provide enabling and disabling of ARD for an entire SNCP-MR, if applicable, through the GUI checkbox. Also, TL-1 commands can also be implemented for ARD.

Figure 5:
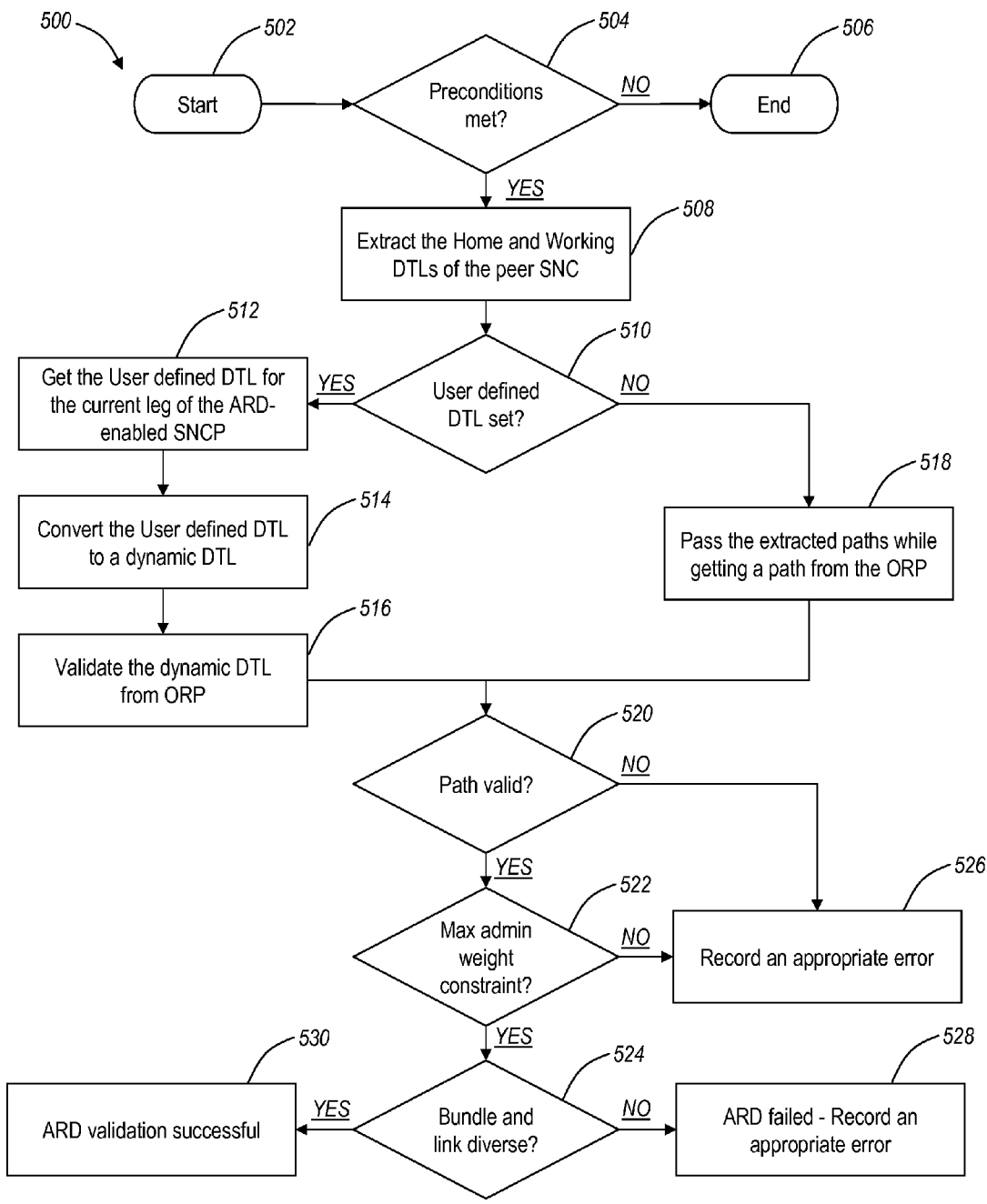
FIG. 5 is a flowchart of ARD validation logic according to an exemplary embodiment of the present invention.

Referring to FIG. 5, a flowchart illustrates ARD validation logic 500 according to an exemplary embodiment of the present invention. The ARD validation logic 500 determines if a SNC from a current leg of an ARD-enabled MR-SNCP has absolute diversity from its peer SNC. The ARD validation logic 500 can be implemented in hardware and/or software, such as in the management system 420, in the nodes 402, etc. The ARD validation logic 500 starts (step 502) by checking if the necessary preconditions are met for ARD validation (step 504). For example, the preconditions include whether the SNCP leg is mesh restorable, whether ARD is enabled, whether the peer SNC exists and originates from the same node, whether the peer SNC of the MR-SNCP is in the working state, and the like. If the preconditions are not met, then the ARD validation logic ends (step 506).

If the preconditions for ARD validation are met, then the home and working DTLs of the peer SNC of the MR-SNCP leg that is being validated are extracted (step 508). The ARD validation logic 500 checks if a User defined DTL set exists (e.g., UsrDtlWPSet) (step 510). If the User defined DTL set exists, then the ARD validation logic 500 gets the User defined DTL for the current leg of the ARD-enabled SNCP (step 512). The User defined DTL is converted to a dynamic DTL (step 514), and the dynamic DTL is validated with ORP (step 516) to provide a path.

If the User defined DTL set does not exist, then ORP gets a path while passing the extracted paths from the peer SNC (step 518). After steps 516 and 518, the path computed in both these steps is checked to see if the path is valid (step 520). If the path is valid, then the ARD validation logic 500 checks to ensure the path is bundle and link diverse from the extracted paths for the peer SNC (step 522). If the path is bundle and link diverse, the ARD validation logic 500 checks that the max admin weight constraint is still valid from the above steps (step 524).

If the path is not valid (step 520) and the max admin weight constraint is not met (step 522), the an appropriate error is recorded based on steps 520 and 522 (step 526). If the paths are not bundle and link diverse (step 524), then the ARD validation logic 500 fails, and an appropriate error based on steps 524 is recorded (step 528). If the paths are bundle and link diverse (step 52), then ARD validation is successful (step 530). In steps 526 and 528, an alarm is not raised always. An alarm is raised only in two scenarios a) Initial Provisioning fails and b) Mesh Restoration fails. In the rest of the cases Regroom, Revert, Switch To Protect if ARD fails, no alarm is raised as SNC is already up and these operations simply fail—so in these cases Only Diagnostics are getting filled. Note (For the three operations where diagnostics are filled—the SNC is UP). After ARD validation, the SNC connection is broken and a new SETUP will be sent to the new Path/DTL. In this case if due to any reason SETUP fails then Alarm will be raised. So in the three cases discussed last Alarm is not really due to ARD.

Figure 6:
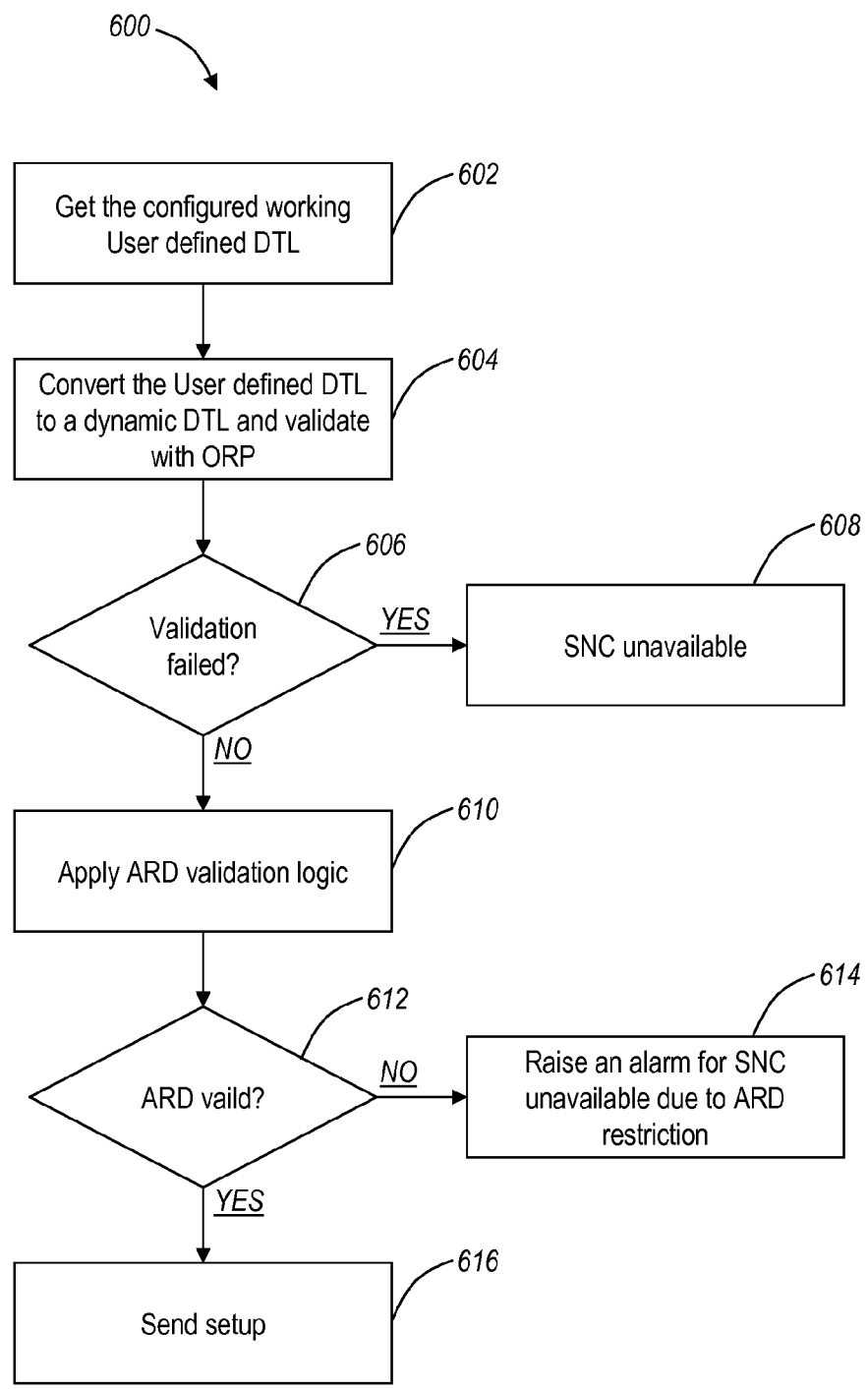
FIG. 6 is a flowchart of ARD unlock behavior according to an exemplary embodiment of the present invention.

Referring to FIG. 6, a flowchart illustrates ARD unlock behavior 600 according to an exemplary embodiment of the present invention. One leg of a MR-SNCP service can be locked in place in case the other leg is inoperative, for example. The lock prevents operations on the operative leg that cause the leg to lose connectivity, other than mesh restoration or tear down. This mechanism is generally referred to as Availability Lock to indicate that its purpose is to maintain availability of the MR-SNCP service in cases where one leg loses connectivity when it was not supposed to.

The Availability Lock applies to one operative leg A when the other leg B of a MR-SNCP is in the following states: during mesh restoration of B, during reversion of B, during one-legged regroom of B, etc. The Availability Lock prevents an operative leg A from attempting reversion of A and initiating a one-legged regroom of A. However, the operative leg A can initiate mesh restoration if its path fails. In such a case, the lock is lifted (notice that leg A is not operative any more). Also, an operative leg can initiate tear down if under Availability Lock. If neither leg is operative, as soon as one leg becomes operative an Availability Lock is placed on the operative leg. The Availability Lock is going to last as long as the other leg is inoperative. If Availability Lock on a leg inhibits execution of a manual Regroom or Revert operation on the same leg, then an exception is generated to indicate the cause to the operator. After being notified, if the operator is still determined to proceed with a possible loss of service availability, the operator can do so by tearing down the SNCP and subsequently attempting establishment of the two legs on the desired, or management system 420 computed, DTLs.

The ARD unlock behavior 600 starts by getting the configured working User defined DTL (e.g., UsrDtl from UsrDtl-WPSet) (step 602). The User defined DTL is converted to a dynamic DTL and validated from ORP (step 604). If the validation fails (step 606), then an alarm is raised with the SNC unavailable (step 608). If the validation passed (step 606), then ARD validation logic is applied (step 610). The ARD validation logic can include the ARD validation logic 500 from FIG. 5, for example. If the ARD is invalid (step 612), then an alarm is raised with the SNC unavailable due to an ARD restriction (step 614). If the ARD is valid (step 612), then a setup message is sent on the available path from the validated dynamic DTL (step 616).

Figure 7:
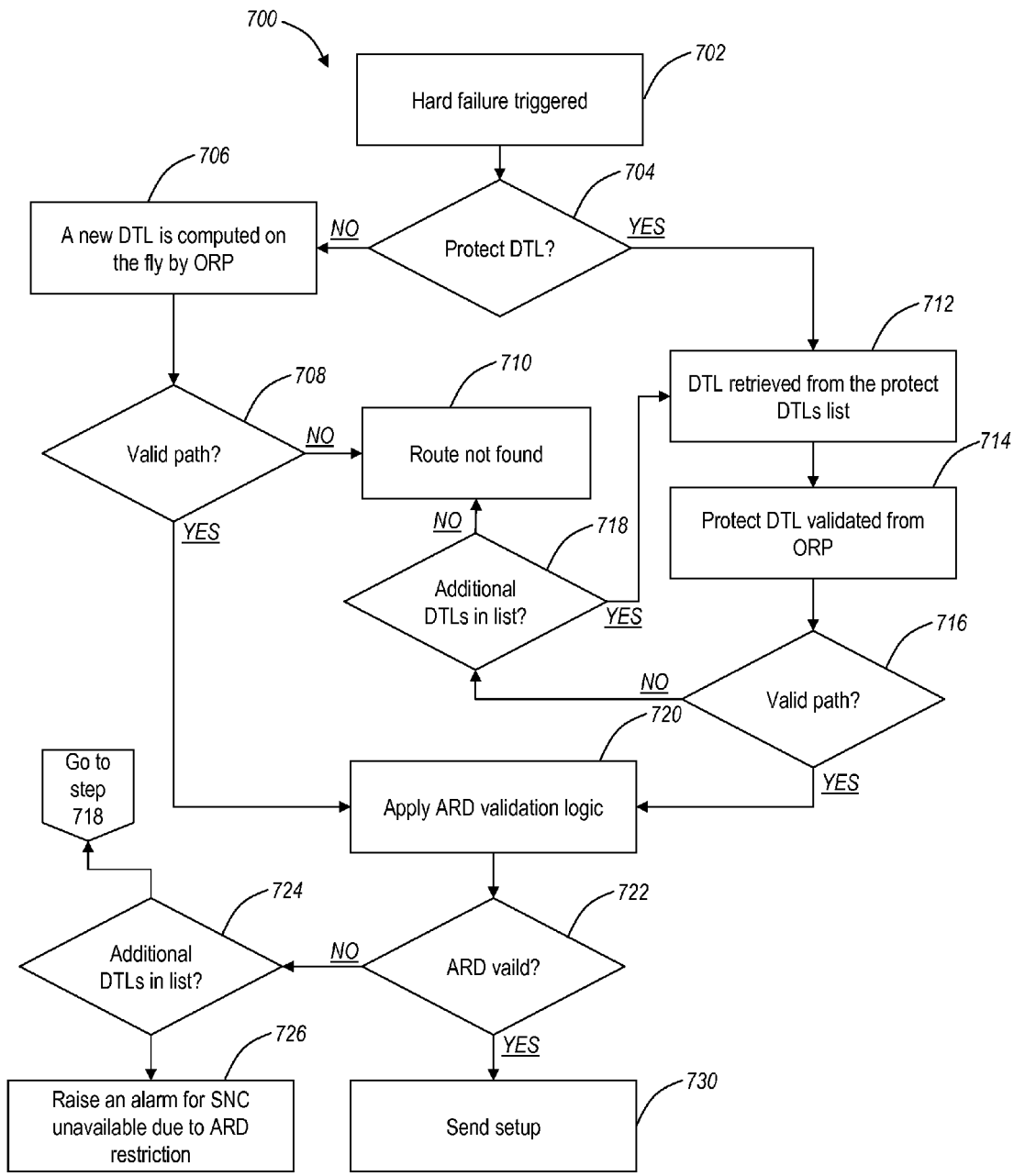
FIG. 7 is a flowchart of mesh restoration behavior with ARD according to an exemplary embodiment of the present invention.

Referring to FIG. 7, a flowchart illustrates mesh restoration behavior 700 with ARD according to an exemplary embodiment of the present invention. Upon occurrence of a failure affecting one or both legs of a MR-SNCP service, an affected leg that is mesh restorable can attempt protection or mesh restoration (this includes possible protection switching and LSMR, based on the leg's class of service). This follows the same procedure as the corresponding service class does, with the additional requirement that a mesh restoration path is computed maximally bundle-diverse from the home path of the other leg, and from the current path of the other leg if available and different from its own home path.

Notice that because of the mesh restoration scheme and the low priority service classes, a backoff timer applies to the restoration phase. As a consequence, the service is not resilient to dual failures for a period of time that includes the expiration of the backoff timer at a minimum. In certain circumstances, mesh restoration of the leg affected by the failure may be completely unachievable. In such cases, establishment of a restoration path for the leg affected by failure is attempted periodically in the same way that an ordinary SNC service attempts restoration periodically.

If one leg is in a transition state, e.g. waiting for mesh restoration to be performed after a failure, and the other leg also experiences a failure, then the entire MR-SNCP service is down until either one leg is able to mesh restore. Notice that because neither leg has a current path any more, the first mesh restoration to be attempted computes the restoration path with fewer diversity constraints than in the case that the other leg was up.

The mesh restoration behavior 700 starts with a hard failure triggered (step 702). The mesh restoration behavior 700 depends on whether the MR-SNCP leg is configured with only a work DTL or with work and protect DTLs (step 704). If the MR-SNCP leg is configured with only a work DTL, then a new DTL is computed on the fly by ORP (step 706). This computed DTL is checked for validity (step 708), and if the path is invalid, then a route is not found (step 710) and an alarm is raised.

If the MR-SNCP leg is configured with work and protect DTLs, then a DTL is retrieved from the protect DTLs list (step 712). The retrieved protect DTL is validated from ORP (step 714). The retrieved protect DTL is checked for validity (step 716), and if the path is invalid, then the mesh restoration behavior 700 checks if there are additional DTLs in the protect DTLs list (step (718). If there are additional DTLs, then another DTL is retrieved from the protect DTLs list (step 712). If there are no additional DTLs, then a route is not found (step 710) and an alarm is raised.

If the path is valid in both steps 708 and 716, then ARD validation logic is applied (step 720). The ARD validation logic can include the ARD validation logic 500 from FIG. 5, for example. If the ARD is invalid (step 722), then if there are additional DTLs in the list (step 724), the mesh restoration behavior 700 returns to step 718. Otherwise, an alarm is raised with the SNC unavailable due to an ARD restriction (step 726). If the ARD is valid (step 722), then a setup message is sent on the available path from the validated dynamic DTL (step 730).

Figure 8:
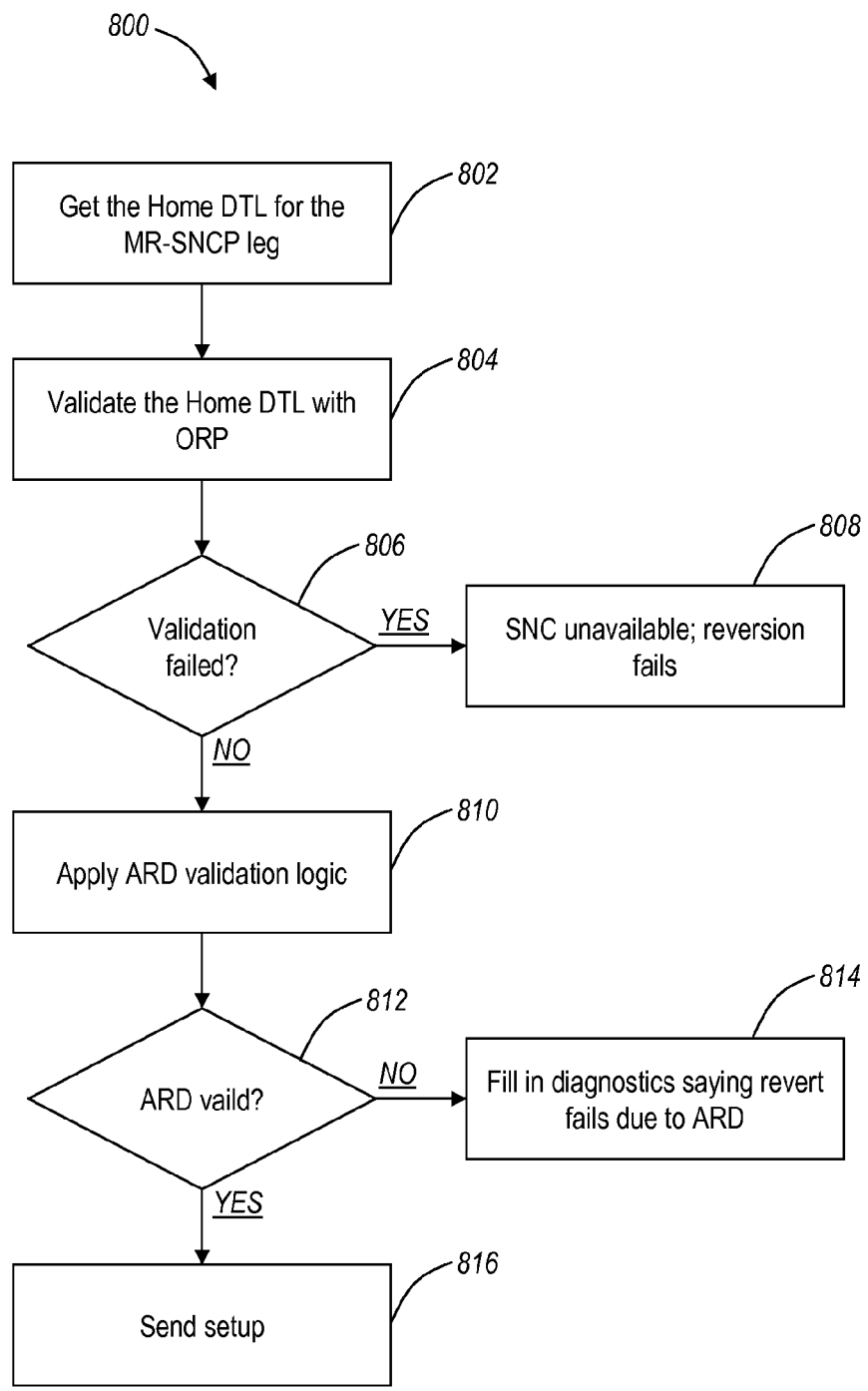
FIG. 8 is a flowchart of reversion behavior with ARD according to an exemplary embodiment of the present invention.

Referring to FIG. 8, a flowchart illustrates reversion behavior 800 with ARD according to an exemplary embodiment of the present invention. When a failure on the home path of one leg is cleared, if the leg is revertive, then the leg is going to try to revert automatically to the home path if the routing information shows it as available. After reversion is initiated, it is possible that the home path is not available anymore—in particular, if another service concurrently occupies the corresponding bandwidth. This might result in temporary loss of one leg for a considerable amount of time, until a restoration path is found and the leg is established on that path. Therefore, it is preferable to avoid operations of reversion or regroom of the other leg at the same time so that the entire MR-SNCP service is not lost for that amount of time.

The reversion behavior 800 starts by getting the Home DTL for the MR-SNCP leg (step 802). The Home DTL leg is validated with ORP (step 804). If the validation fails (step 806), the SNC is unavailable and the reversion fails (step 808). If the validation is successful (step 810), then ARD validation logic is applied (step 810). The ARD validation logic can include the ARD validation logic 500 from FIG. 5, for example. If the ARD is invalid (step 812), the reversion fails due to an ARD restriction and this is filled in Diagnostics (step 814). If the ARD is valid (step 812), then a setup message is sent on the available path from the validated dynamic DTL (step 816).

Figure 9:
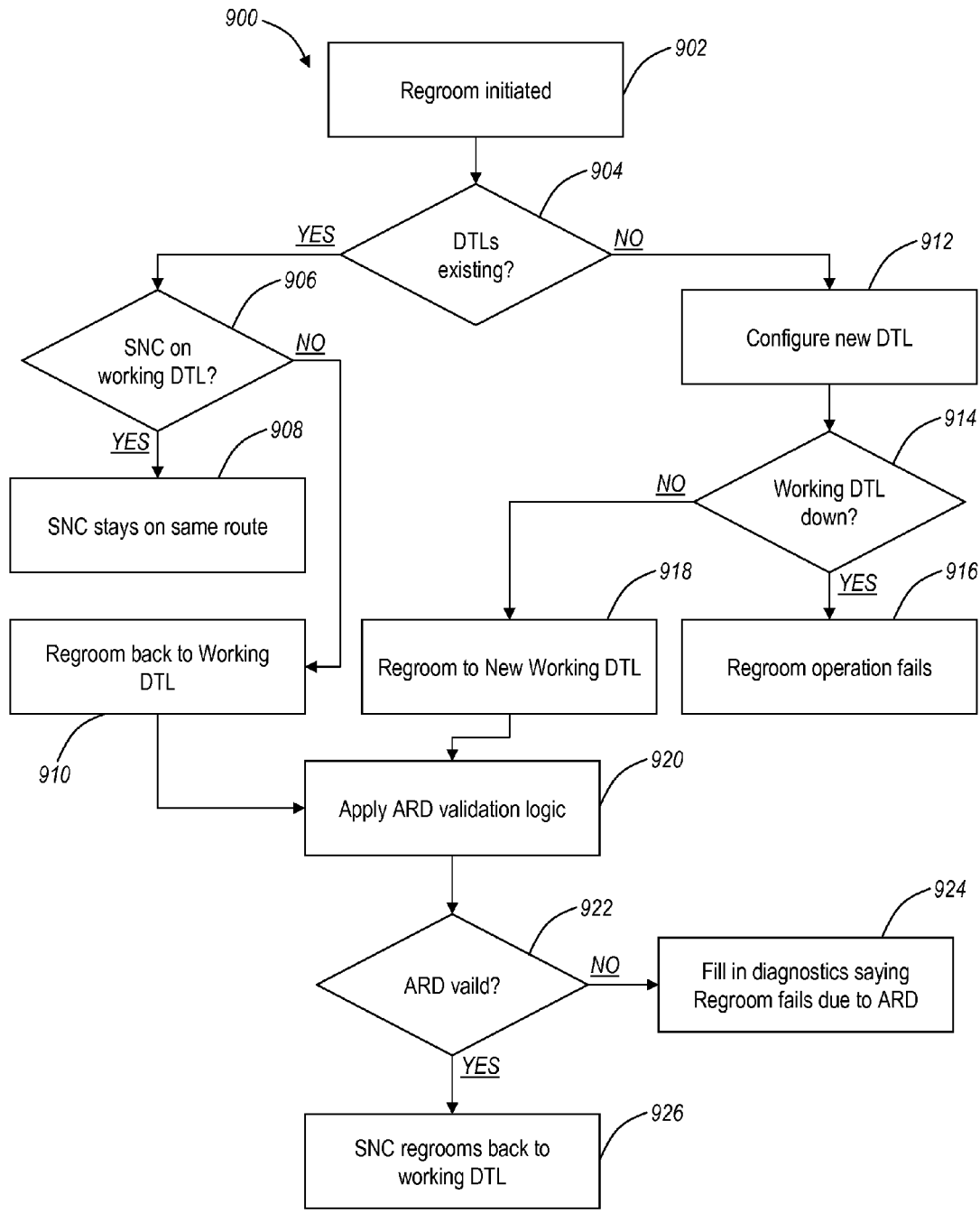
FIG. 9 is a flowchart of regroom behavior with ARD according to an exemplary embodiment of the present invention.

Referring to FIG. 9, a flowchart illustrates regroom behavior 900 with ARD according to an exemplary embodiment of the present invention. Due to the reaction to failures (mesh restoration), either one or both legs of a MR-SNCP service can be on a path that is different from the original home path (user-configured DTL). Also, the network may have undergone such changes that make the home paths obsolete by certain standards, in particular considering that home paths were possibly computed to satisfy certain requirements. Therefore, a Regroom operation may be required. The Regroom operation can be orchestrated through the management system 420 and potentially includes two phases, one each for the two legs of the MR-SNCP service, i.e. each phase can be referred to as a One-Legged Regroom.

Independently of which leg of the MR-SNCP service the One-Legged Regroom operation is applied to, the operation requires one user-configured DTL to be used as the home route. The user-configured DTL can be changed at any time, and the One-Legged Regroom can use the most recent one. Similarly to MR-SNCP service establishment, during One-Legged Regroom the DTL is going to be used in a DTL-exclusive way, i.e., if the leg cannot be established on the available DTL then the One-Legged Regroom fails. It is possible that no path can be found for the One-Legged Regroom even though one was available previously, for instance due to service establishment through other mechanisms while the regroom is attempted or because of mesh restoration of another service. In this case, the leg trying regroom may remain in a failed state indefinitely. Therefore, it is preferable to avoid operations of reversion or regroom of the other leg at the same time so that the entire MR-SNCP service is not down for that amount of time.

The regroom behavior 900 is initiated by a regroom operation (step 902). The regroom behavior 900 checks to see if there are existing DTLs (step 904). If there are existing DTLs, i.e. work and protect DTLs or only work DTLs, then the regroom behavior 900 checks if the current SNC is on the working DTL (step 906). If the current SNC is on the working DTL, the SNC stays on the same route and the regroom operation is complete (step 908). If the current SNC is not on the working DTL, a regroom is performed to move the SNC back to the working DTL (step 910).

If there are no existing DTLs (step 904), then a new DTL is configured (step 912). The regroom behavior 900 checks to see that the working DTL from the new DTL is not down (step 914). If the working DTL is down, then the regroom operation fails (step 916). If not, then the regroom operation proceeds to the new working DTL (step 918). With the working DTL from steps 910 and 918, the regroom behavior 900 applies ARD validation logic (step 920). The ARD validation logic can include the ARD validation logic 500 from FIG. 5, for example. If the ARD is invalid (step 922), then Diagnostics are filled in saying regroom fails due to ARD (step 924). If the ARD is valid (step 922), then a setup message is sent on the available path to regroom back to the working DTL (step 926).

Figure 10:
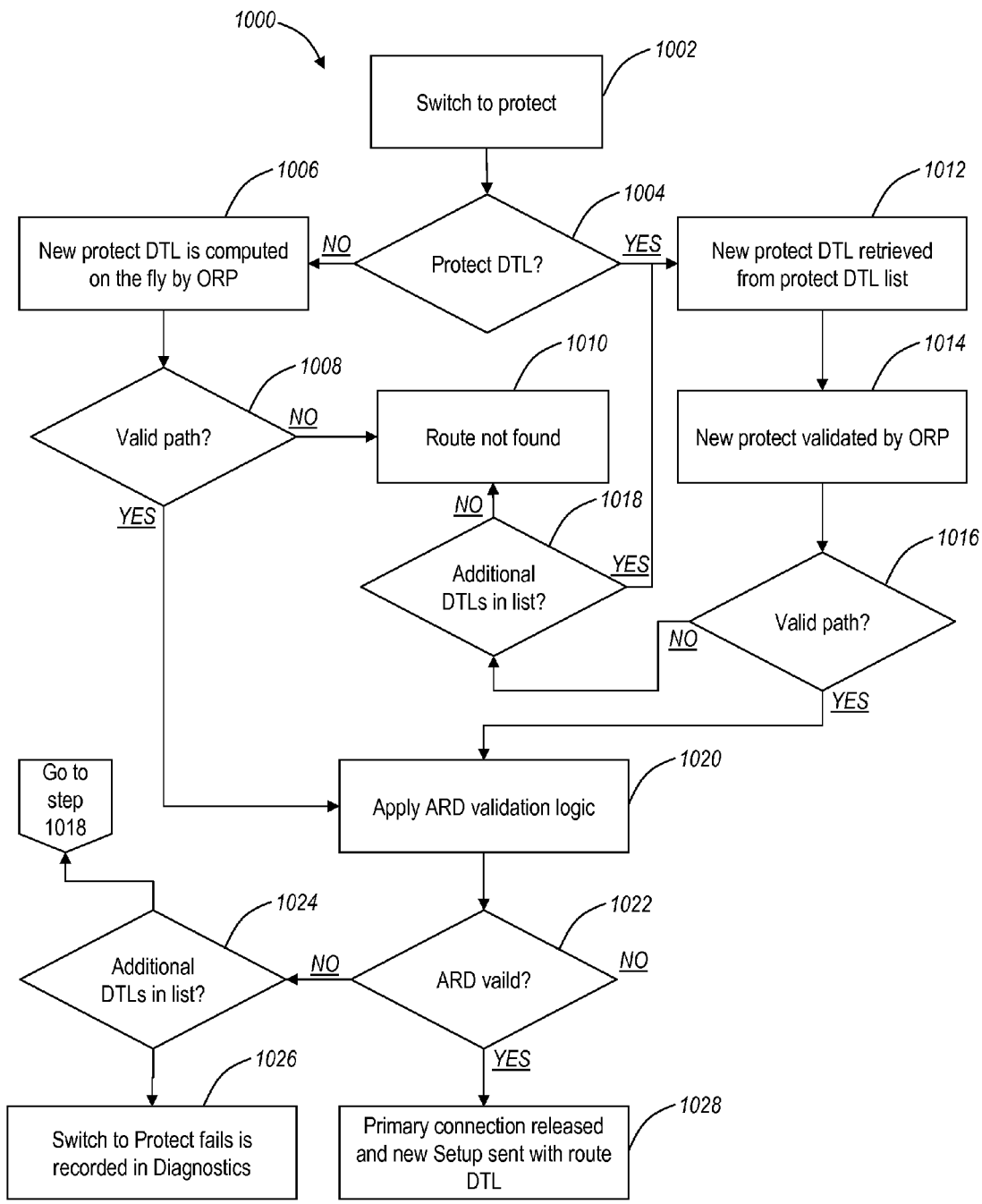
FIG. 10 is a flowchart of switch to protect behavior with ARD according to an exemplary embodiment of the present invention.

Referring to FIG. 10, a flowchart illustrates switch to protect behavior 1000 with ARD according to an exemplary embodiment of the present invention. Switch to Protect is a manual operation. It is applied only on the SNC leg which is in working state. Its purpose is to switch to a new Protect DTL/Path. So this operation can be applied either on a working leg or a protect leg of the SNCP-MR. Switch to protect is initiated (step 1002). The switch to protect behavior 1000 checks whether the MR-SNCP leg is configured with only Work DTL or with Work and Protect DTLs (step 1004). If there is no Protect DTL, then a new protect DTL is computed on the fly by ORP (step 1006). If ORP is not able to get a new Protect DTL (step 1008), then a route is not found (step 1010) and the failed leg is not able to restore.

If there are protect DTLs (step 1004), then a new protect DTL is retrieved from the protect DTL list (step 1012). The retrieved route is validated by ORP (step 1014). If the path is invalid (step 1016), the switch to protect behavior 1000 checks to see if there are additional protect DTL routes in the protect DTL list (step 1018). If there are additional protect DTL routes, then the switch to protect behavior 1000 retrieves a new protect DTL route from the protect DTL list (step 1012). If no additional routes are available, then a route is not found (step 1010) and the failed leg is not able to restore.

If valid paths are found in steps 1008 and 1016, then the switch to protect behavior 1000 applies ARD validation logic (step 1020). The ARD validation logic can include the ARD validation logic 500 from FIG. 5, for example. If the ARD is invalid (step 1022), then if there are additional DTLs in the list (step 1024), the switch to protect behavior 1000 returns to step 1018. Otherwise, switch to protect fails is recorded in Diagnostics (step 1026). If the ARD is valid (step 1022), then the primary connection is released and a new setup message is sent with the valid route DTL (step 1028).

Figure 11:
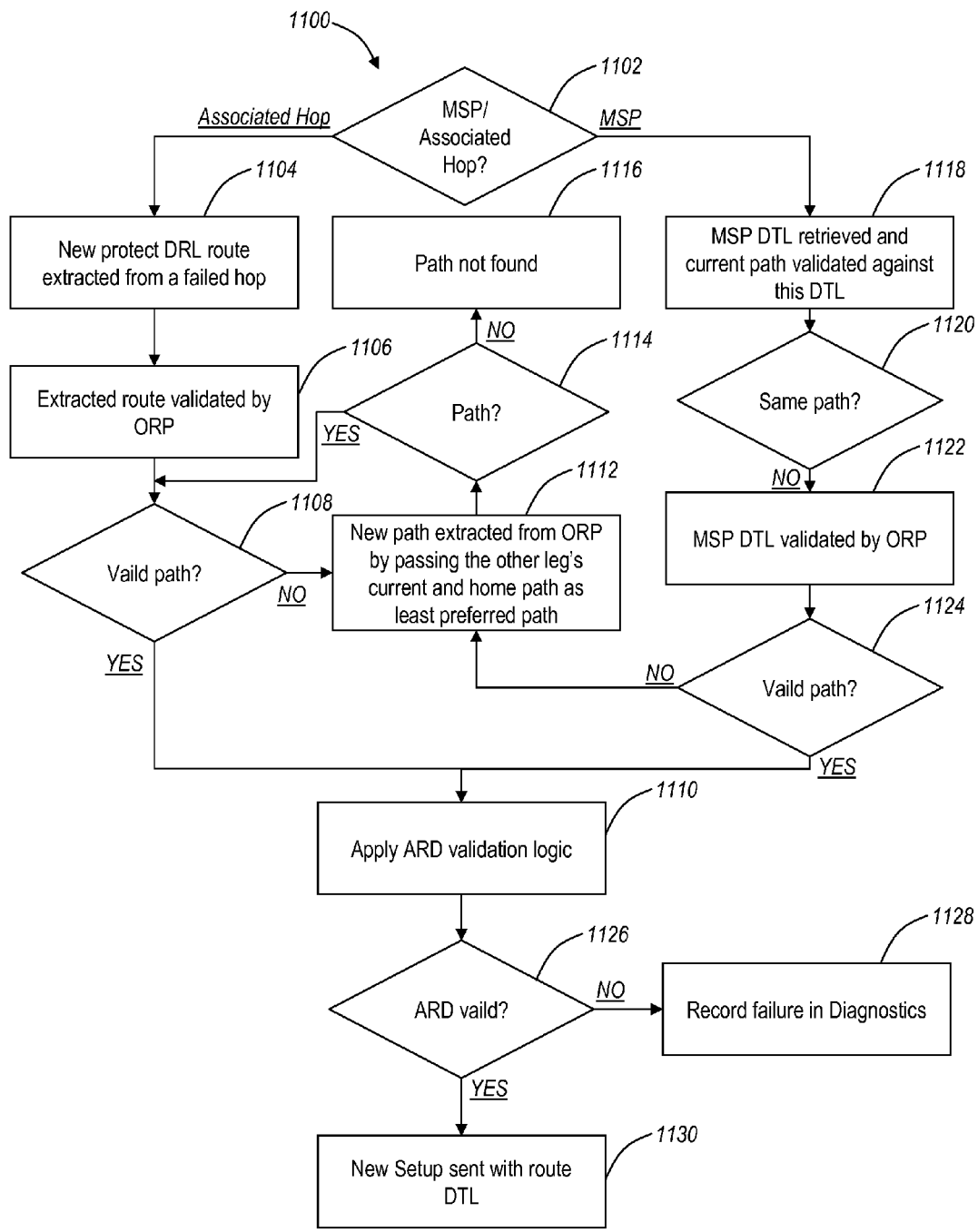
FIG. 11 is a flowchart of associated hop DTL and Manual Switch to Protect (MSP) DTL behavior with ARD according to an exemplary embodiment of the present invention.

Referring to FIG. 11, a flowchart illustrates associated hop DTL and Manual Switch to Protect (MSP) DTL behavior 1100 with ARD according to an exemplary embodiment of the present invention. The behavior 110 checks for associated hop DTL and MSP DTL (step 1102). If it is associated hop DTL, a new protect DTL is extracted from the failed Hop (step 1104), and is validated against ORP (step 1106). If ORP validates this path (step 1108), then ARD validation is applied against this path (step 1110). If ORP invalidates this path (step 1108), then a new path is extracted from ORP by passing the other leg's current and home path as least preferred path (step 1112). If there is a path available (step 1114) and it is valid (step 1108), then ARD validation is applied against that path (step 1110). If a path is not available (step 1114), then the behavior 1100 ends with a path not found (step 1116).

If the behavior 1100 is MSP (step 1102), then the MSP DTL is retrieved and a current path is validated against this DTL (step 1118). If the paths are the same (step 1120), then the behavior 1100 changes the SNC diags indicating it is on same path. If the paths are not same (step 1120), then MSP DTL is validated in ORP (step 1122). The MSP DTL is check for validity (step 1124). If invalid, the behavior 1100 goes to step 1112. If the path is valid from steps 1108 and 1124, then ARD validation logic is applied (step 1110). The ARD validation logic can include the ARD validation logic 500 from FIG. 5, for example. If the ARD is invalid (step 1126), then a failure is recorded in Diagnostics (step 1128). If the ARD is valid (step 1126), then a new setup message is sent with the valid route DTL (step 1128).

In all of the behaviors described herein, the presence or absence of the ARD constraint on a peer SNC acts in conjunction with the presence or absence of a Max Admin Weight (MAW) restriction. When both restrictions are enabled, only paths that satisfy both restrictions can be attempted. In particular for automatically computed paths, only the lowest cost path that avoids all the protection bundles in the other peer SNC's home and current paths is going to be examined for MAW.

Figure 12:
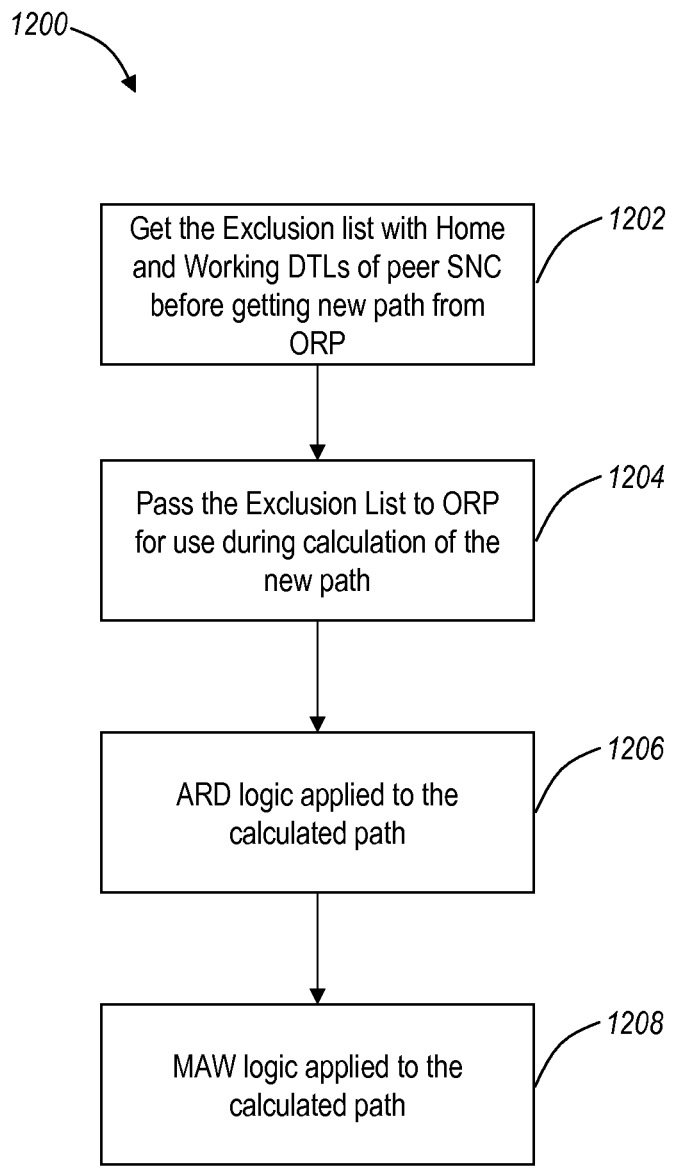
FIG. 12 is a flowchart of automatically computed path behavior with ARD according to an exemplary embodiment of the present invention.

Referring to FIG. 12, a flowchart illustrates automatically computed path behavior 1200 with ARD according to an exemplary embodiment of the present invention. There are two scenarios where automatically computed paths from ORP are tried. These two instances go along with a peer SNC when it configured only with Working DTL without any Protect DTLs. These two instances include during a Hard Failure, when there is no Protect DTLs configured, and during a Switch To Protect when there is no Protect DTL configured. For automatically computed paths, the steps to apply MAW and ARD in the automatically computed path behavior 1200 include getting the Exclusion List with Home and Working DTLs of peer SNC before getting the new path from ORP (step 1202). This Exclusion List is passed to ORP to be excluded during calculation of the new path (step 1204). This path is not necessarily Absolute Diverse. Once the new path is calculated considering the above restrictions, ARD validation logic is applied (step 1206). After ARD validation, MAW logic is applied (step 1208). The ARD validation logic can include the ARD validation logic 500 from FIG. 5, for example.

Figure 13:
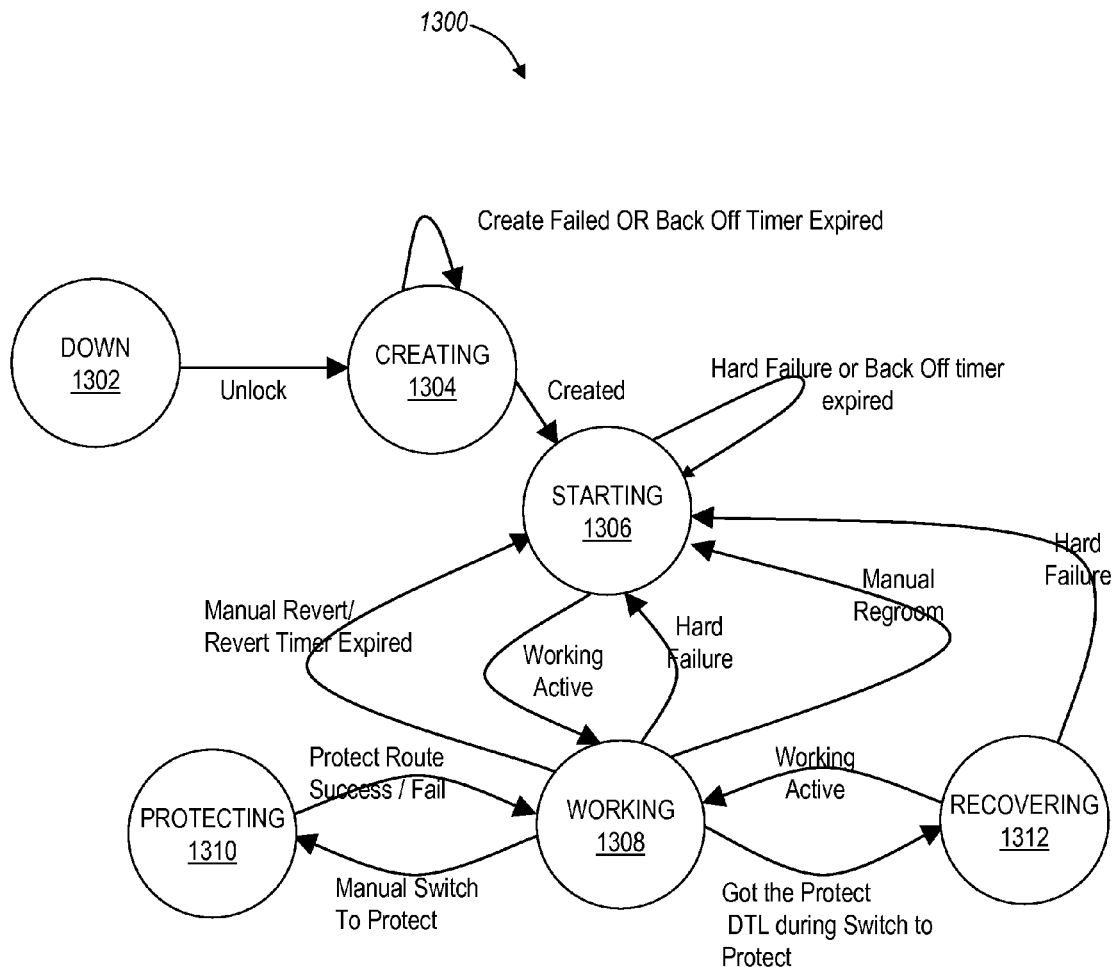
FIG. 13 is a state diagram of behaviors of an MR-SNCP leg according to an exemplary embodiment of the present invention.

Referring to FIG. 13, a state diagram 1300 illustrates behaviors of an MR-SNCP leg according to an exemplary embodiment of the present invention. The state diagram 1300 includes a down 1302, creating 1304, starting 1306, working 1308, protecting 1310, and recovering 1312 state. By earlier design, a SNC corresponding to a SNCP-MR leg is a low priority SNC which does not have any pre-computed Protect DTLs and during Switch To Protect, Protect DTLs are computed on the fly either from UsrDTLWPSet or from ORP and Protecting 1310 as well as Recovering 1312 states are just transitioned during the Manual Switch To Protect. Manual Revert/Revert Timer Expiry, Manual Regroom and Hard Failure follow the same flow of Low Priority SNC.

There are six cases in which ARD can be triggered with the condition that all the ARD pre-conditions must be satisfied. The six cases include initial provisioning/unlock from the down 1302 state, a hard failure (from either the starting 1306, the working 1308, or the recovering 1312 states, a manual revert from the working 1308 state, a revert timer expired from the working 1308 state, a manual regroom from the working 1308 state, and a manual switch to protect from the working 1308 state. These six triggers lead to various state changes as captured by the state diagram 1300.

Due to the ARD feature, additional ARD validation logic is applied on all the ORP validated/returned paths, and these state changes are just blocked on the ARD validation logic in all these above cases. Thus in the new model of ARD, the SNC corresponding to a SNCP-MR leg will never pick a DTL for it new SETUP unless it is validated by the ARD logic.

Figure 14:
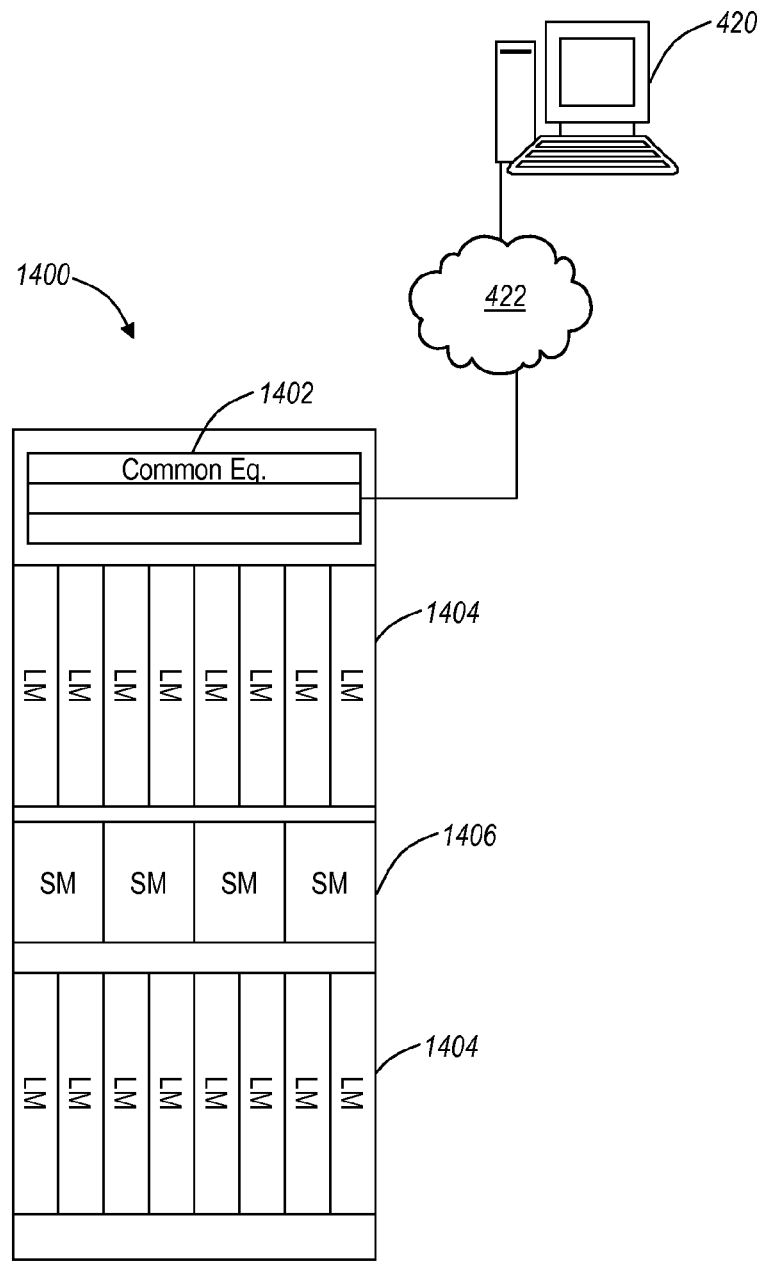
FIG. 14 is a diagram of a multi-service, multi-protocol switching system that can utilize ARD with regard to MR-SNCP services according to an exemplary embodiment of the present invention.

Referring to FIG. 14, a multi-service, multi-protocol switching system 1400 that can utilize ARD with regard to MR-SNCP services is illustrated according to an exemplary embodiment of the present invention. For example, the switching system 1400 can include an optical switch network element (NE) that can consolidate the functionality of a multi-service provisioning platform (MSPP), digital cross connect (DCS), Ethernet and Optical Transport Network (OTN) switch, into a single, high-capacity intelligent switching system.

Generally, the switching system 1400 includes common equipment 1402, line modules 1404, and switch modules 1406. The common equipment 1402 can include power, a control module, OAM&P access, and the like. For example, the common equipment 1402 can connect to the management system 420 through a network 422. Additionally, the control module can be configured to operate the control plane and the systems and methods described herein with regard to ARD.

The line modules 1404 are communicatively coupled to the switch modules 1406, such as through a backplane, midplane, or the like. The line modules 1404 are configured to provide ingress and egress to the switch modules 1406, and are configured to provide interfaces for the MR-SNCP services described herein. For example, the line modules 1404 can include optical transceivers, such as, for example, 2.5 Gb/s (OC-48/STM-1, OTU1), 10 Gb/s (OC-192/STM-64, OTU2), 40 Gb/s (OC-768/STM-256, OTU3), etc. The line modules 1404 can include DWDM interfaces, short reach interfaces, and the like, and can connect to other line modules 1404 on remote NEs, end clients, and the like.

The switch modules 1406 are configured to switch services between the line modules 1404. For example, the switch modules 1406 can provide wavelength granularity, SONET/SDH granularity, OTN granularity, Ethernet granularity, and the like. The switch modules 1406 can include redundancy as well. Collectively, the line modules 1404 and the switch modules 1406 can provide an MR-SNCP service with ARD as described herein.

Figure 15:
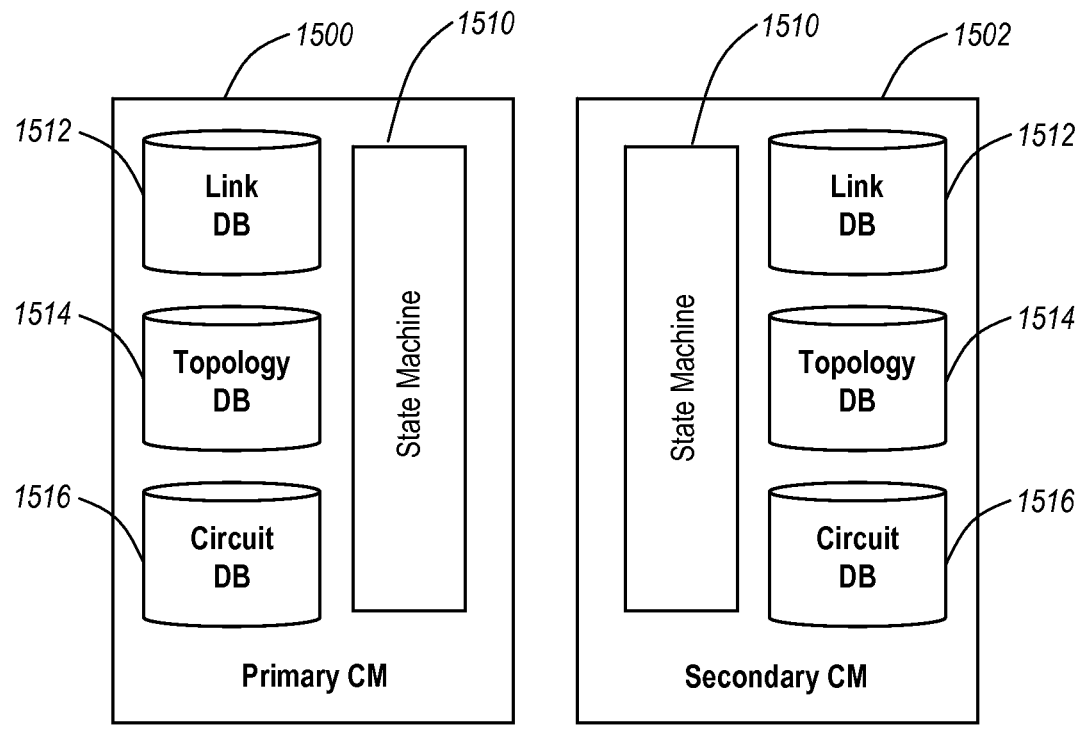
FIG. 15 is a diagram of redundant control modules (CMs) to provide control plane processing to enable an MR-SNCP service with ARD according to an exemplary embodiment of the present invention.

Referring to FIG. 15, redundant control modules (CMs) 1500, 1502 are illustrated to provide control plane processing to enable an MR-SNCP service with ARD according to an exemplary embodiment of the present invention. For example, the CMs 1500, 1502 can be part of common equipment, such as common equipment 1402 in the system 1400 of FIG. 14. The CMs 1500, 1502 can include a processor which is hardware device for executing software instructions. The processor can be any custom made or commercially available processor, a central processing unit (CPU), an auxiliary processor among several processors associated with the CMs 1500, 1502, a semiconductor-based microprocessor (in the form of a microchip or chip set), or generally any device for executing software instructions. When the CM 1500, 1502 is in operation, the processor is configured to execute software stored within memory, to communicate data to and from the memory, and to generally control operations of the CM 1500, 1502 pursuant to the software instructions.

The CMs 1500, 1502 can also include network interfaces, a data store, memory, and the like. The network interfaces can be used to enable the CMs 1500, 1502 to communicate on a network, such as to communicate control plane information to other CMs. The network interfaces can include, for example, an Ethernet card (e.g., 10BaseT, Fast Ethernet, Gigabit Ethernet) or a wireless local area network (WLAN)

card (e.g., 802.11a/b/g). The network interfaces can include address, control, and/or data connections to enable appropriate communications on the network. The data store can be used to store data, such as control plane information received from NEs, other CMs, etc. The data store can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store can incorporate electronic, magnetic, optical, and/or other types of storage media. The memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory can have a distributed architecture, where various components are situated remotely from one another, but can be accessed by the processor.

Each of the CMs 1500, 1502 include a state machine 1510, a link database (DB) 1512, a topology DB 1514, and a circuit DB 1516. The CMs 1500, 1502 are responsible for all control plane processing, e.g. OSRP, to provide MR-SNCP with ARD services. For example, the CMs 1500, 1502 can be configured in a redundant 1+1, 1:1, etc. configuration. The state machine 1510 is configured to implement the behaviors described herein with regard to ARD. The DBs 1512, 1514, 1516 can be stored in the memory and/or data store. The link DB 1512 includes updated information related to each link in a network. The topology DB 1514 includes updated information related to the network topology, and the circuit DB 1516 includes a listing of terminating circuits and transiting circuits at an NE where the CMs 1500, 1502 are located. The CMs 1500, 1502 can utilize control plane mechanisms to maintain the DBs 1512, 1514, 1516. For example, a HELLO protocol can be used to discover and verify neighboring ports, nodes, protection bundles, and the like. Also, the DBs can share topology state messages to exchange information to maintain identical data.

Figure 16:
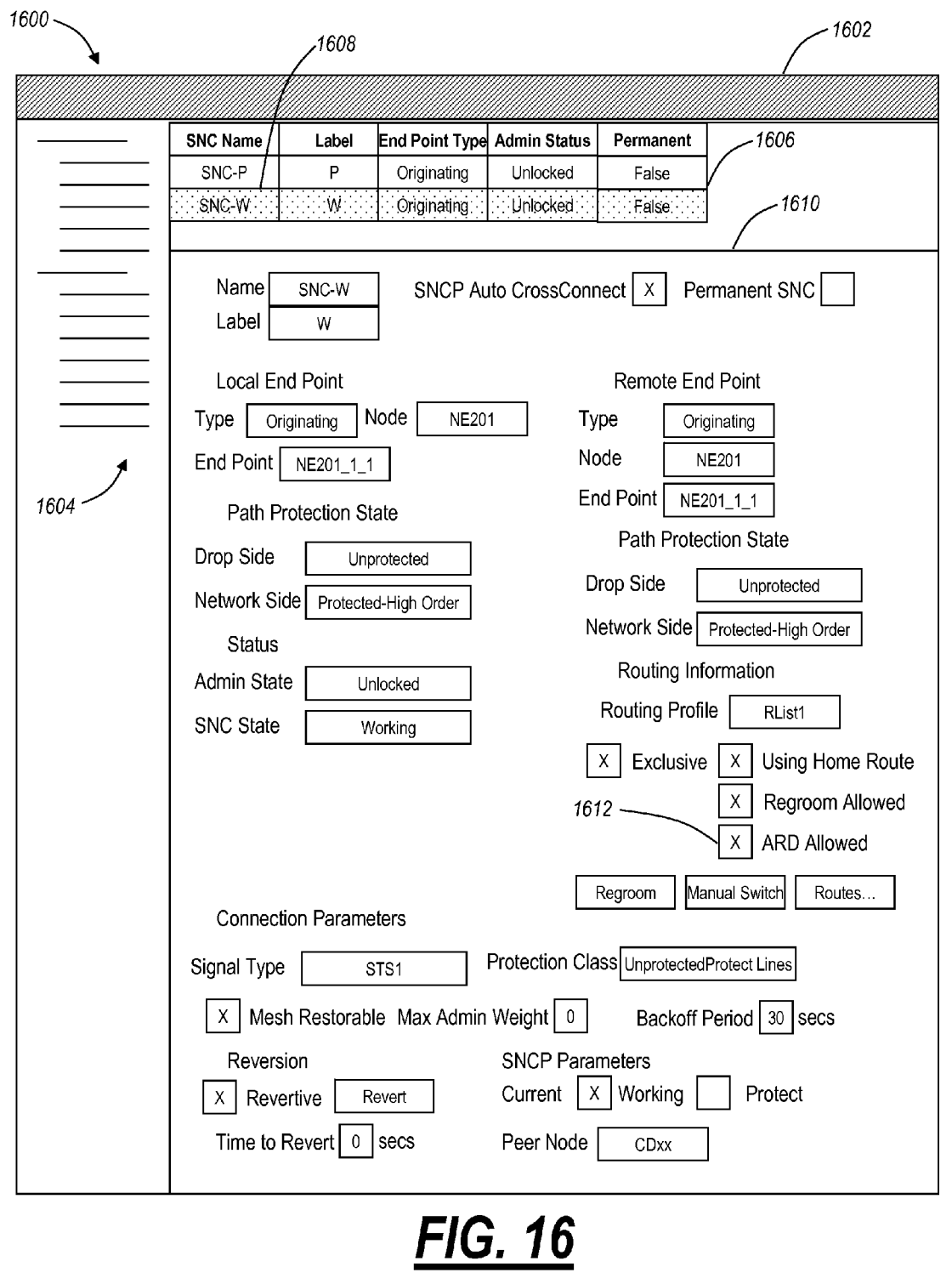

Referring to FIG. 16, a management screen GUI 1600 illustrates a MR-SNCP service with ARD according to an exemplary embodiment of the present invention. For example, the GUI 1600 can be hosted on the management system 420, and accessed via a remote client, such as through a Web interface. The GUI 1600 enables provisioning of a MR-SNCP service on a node. The GUI 1600 can include a toolbar 1602 for navigation and other functions, a tree list 1604 for selecting nodes, circuits, etc., a table 1606 for selecting a particular circuit (e.g., SNC-W 1608 in the example of FIG. 16), and a work area 1610 for provisioning particular attributes of the particular circuit, i.e. SNC-W 1608. For example, the GUI 1600 can be associated with the system 1400 and the CMs 1500, 1502.

In an exemplary embodiment of the present invention, ARD is a circuit level parameter, and only impacts for the MR-SNCP circuit which selects this option, i.e. SNC-W 1608. The ARD option can be presented as a GUI check box from the GUI 1600, i.e. checkbox 1612. The ARD selection is a property of the MR-SNCP circuit, and is visible from all MR-SNCP related screens. A user can select and change the ARD selection 1612 at any time. The ARD change only takes effect from the next restoration event. By default, the ARD check box 1612 can be Un-selected.

ARD only impacts a mesh-restoring, failed MR-SNCP leg. It does not change system behaviors of a regular SNC. When ARD is enabled, to restore a failed MR-SNCP leg, the system tries to find an alternative path which has NO overlap in any OSRP link or bundle ID with the Current working path of the peer SNC and the Home Route of the peer SNC, if the peer SNC is revertive. If the peer SNC is in failed state, the routing constraints can be removed even if the ARD option is selected (to avoid traffic outages).

Also, the ARD feature and MAX Admin Weight (MAW) feature can be used in conjunction on MR-SNCP. When both ARD and MAW are enabled, the system routing engine can select the paths meeting both MAX and ARD requirements; if more than one routes meet both MAW and ARD constraints, the path with lowest Admin Weight can be selected. When ARD is enabled, if the system cannot find an ARD path for failed SNCP leg, the path goes down, and alarmed. The MR-SNCP circuit then acts as single SNC Mode. The system can retry the mesh restoration in the background with pre-set intervals (the same with current normal SNC behavior), which are configurable in the GUI 1600. The single SNC MODE circuit can be back to a MR-SNCP mode once a suitable path is found or failed leg is restored. The alarm can be cleared automatically.

The system 1400 can be configured to allow a peer SNC 'A' that is not a P-SNC and is part of an SNCP which has its other peer SNC 'B' originating on the same NE, to be enabled or disabled for ARD. Conversely, the system 1400 can be configured to not allow a peer SNC 'A' that is part of an SNCP which has its other peer SNC 'B' originating on a different NE, to be enabled or disabled for ARD. The system 1400 can be configured to not allow a peer SNC 'A' that is P-SNC and is part of an SNCP to be enabled or disabled for ARD. Also, the system 1400 can be configured to not allow an ordinary SNC (not a peer SNC of any SNCP) to be enabled or disabled for ARD. The system 1400 can allow the two peer SNCs of a SNCP to be ARD enabled or disabled independently, if applicable. The enabling and disabling of ARD, if applicable, can be at any time including creation time. Also, the GUI 1600 can remove the checkbox 1612 if ARD is not applicable to the selected service.

When a peer SNC 'A' is provisioned and a peer SNC 'B' is unprovisioned, the system 1400 behavior does not differ from ordinary behavior whether ARD is enabled or disabled for peer SNC 'A'. When an ARD-enabled peer SNC 'A' is provisioned and a peer SNC 'B' is already provisioned and it is active, the system 1400 does not establish peer SNC 'A' on any path that shares one or more protection bundle IDs with home path and current path of peer SNC 'B'. When an ARD-enabled peer SNC 'A' is provisioned and a peer SNC 'B' is already provisioned but down, the system 1400 allows the peer SNC 'A' on a path that shares one or more protection bundle IDs with the home path of peer SNC 'B'. If the peer SNC 'A' of an SNCP-MR is ARD-enabled and its provisioning fails, then the existing alarm that is raised after 30 seconds can be assigned a probable cause of "ARD restriction".

The system 1400 does not allow an ARD-enabled peer SNC 'A' to use any path that shares one or more protection bundle IDs with the home path and current path of the peer SNC 'B', if the peer SNC 'B' is active, when the peer SNC 'A' is looking for a new path following either one of: (a) mesh restoration; (b) regroom; (c) reversion; or (d) switch to protect. The system 1400 allows an ARD-enabled peer SNC 'A' to use a path that shares one or more protection bundle IDs with the home path and current path of the peer SNC 'B' only if the peer SNC 'B' is provisioned but it is down at that time.

After ARD is enabled for a peer SNC that is ARD-disabled and is active, the system 1400 applies the ARD constraint at the first occurrence of an event among: (a) mesh restoration; (b) regroom; (c) reversion; or (d) switch to protect with no M-STP DTL. After ARD is disabled for a peer SNC that is ARD-enabled and is active, the system 1400 can cease applying the ARD constraint at the first occurrence of an event among: (a) mesh restoration; (b) regroom; (c) reversion; or (d) switch to protect.

After ARD is enabled for a peer SNC 'A' that is ARD-disabled and is down, only if the peer SNC 'B' is active does the system 1400 apply the ARD constraint at the first scheduled attempt at finding a new path. After ARD is disabled for a peer SNC that is ARD-enabled and is down, the system 1400 can cease applying the ARD constraint at the first scheduled attempt at finding a path. The system 1400 can apply the ARD constraint, when applicable, in conjunction with Max Admin Weight (MAW) if a MAW setting is specified for the same peer SNC. For an ARD-enabled peer SNC 'A' that is down after an attempt at moving to a new path, the system 1400 can assign a probable cause of "ARD restriction" to the existing alarm that is raised after 30 seconds that 'A' is down, whatever state peer SNC 'B' is in. The application of the ARD constraint has negligible performance impact on establishment of a peer SNC of an MR-SNCP for the following events: (a) provisioning; (b) mesh restoration; (c) regroom; (d) reversion; and (e) switch to protect.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A switch configured to provide Absolute Route Diversity for Mesh Restorable connections, the switch comprising:
   one or more line interfaces;
   a control module configured to operate a control plane and to control the one or more line interfaces; and
   a Mesh Restorable Sub Network Connection Protection service comprising a first leg and a second leg, wherein the Mesh Restorable Sub Network Connection Protection service is provided through the one or more line interfaces;
   wherein the control module ensures Absolute Route Diversity for each of the first leg and the second leg;
   wherein, if the control module cannot ensure Absolute Route Diversity for each of the first leg and the second leg, the first leg and the second leg are treated together as a single Sub Network Connection for purposes of mesh restoration thereby ensuring Absolute Route Diversity therebetween; and
   wherein a protection path is computed upon a failure.

2. The switch of claim 1, wherein the control module ensures Absolute Route Diversity for each of the first leg and the second leg during any of provisioning, mesh restoration, regrooming, reversion, and switch to protect.

3. The switch of claim 1, further comprising:
   Absolute Route Diversity validation logic configured to determine if a path for the first leg is bundle and link diverse from the second leg.

4. The switch of claim 3, wherein responsive to the Absolute Route Diversity validation logic determining that the path is not diverse, the path is not setup and the Mesh Restorable Sub Network Connection Protection service is operated as a Sub Network Connection.

5. The switch of claim 3, further comprising:
   Maximum Admin Weight validation logic configured to determine if the path meets a Maximum Admin Weight restriction.

6. The switch of claim 3, wherein for the first leg, the Absolute Route Diversity validation logic is configured to ensure a path for the first leg avoids links that belong to a home path of the second leg and links that belong to a current path of the second leg.

7. The switch of claim 1, wherein the control plane comprises any of Optical Signal and Routing Protocol (OSRP), Automatically Switched Optical Network (ASON), and Generalize Multi-Protocol Label Switching (GMPLS).

8. A method for providing Absolute Route Diversity for Mesh Restorable connections, the method comprising:
   provisioning a Mesh Restorable Sub Network Connection Protection service comprising a first leg and a second leg;
   determining Absolute Route Diversity of a path for the first leg responsive to a trigger event;
   if Absolute Route Diversity is valid, setting up the path; and
   if Absolute Route Diversity is invalid, operating the path as a Sub Network Connection;
   wherein, if Absolute Route Diversity is invalid, the first leg and the second leg are treated together as a single Sub Network Connection for purposes of mesh restoration thereby ensuring Absolute Route Diversity therebetween; and
   wherein a protection path is computed upon a failure.

9. The method of claim 8, wherein the trigger comprises any of provisioning, mesh restoration, regrooming, reversion, and switch to protect.

10. The method of claim 8, further comprising:
    enabling Absolute Route Diversity for the first leg.

11. The method of claim 8, further comprising:
    selecting the path for the first leg responsive to the trigger event.

12. The method of claim 11, wherein determining Absolute Route Diversity comprises:
    ensuring the path for the first leg avoids links that belong to a home path of the second leg and links that belong to a current path of the second leg.

13. The method of claim 12, further comprising:
    ensuring the path meets a Maximum Admin Weight restriction.

14. The method of claim 12, further comprising:
    periodically checking for Absolute Route Diversity on the path; and
    reverting back to the Mesh Restorable Sub Network Connection Protection responsive to Absolute Route Diversity on the path.

15. The method of claim 8, further comprising:
    defining a Designated Transit List for the first leg; and
    defining a Designated Transit List for the second leg.

16. A network with Absolute Route Diversity for Mesh Restorable connections, the network comprising:
    a plurality of nodes;
    a plurality of links interconnecting the plurality of nodes
    a control plane between the plurality of nodes;
    an ingress node of the plurality of nodes;
    an egress node of the plurality of nodes;
    a Mesh Restorable Sub Network Connection Protection service originating at the ingress node and terminating at the egress node, the Mesh Restorable Sub Network Connection Protection service comprising a first leg and a second leg, wherein the first leg and the second leg each diversely traverse the plurality of links; and Absolute Route Diversity validation logic configured to determine if a path for the first leg is bundle and link diverse from the second leg responsive to a trigger event;

wherein, if the Absolute Route Diversity validation logic cannot determine that the path for the first leg is bundle and link diverse from the second leg, the first leg and the second leg are treated together as a single Sub Network Connection for purposes of mesh restoration thereby ensuring Absolute Route Diversity therebetween; and wherein a protection path is computed upon a failure.

17. The network of claim 16, wherein the trigger event comprises any of provisioning, mesh restoration, regrooming, reversion, and switch to protect.

18. The network of claim 17, wherein the control plane is configured to control the trigger event; and wherein responsive to the path lacking Absolute Route Diversity, the second leg operates as a Sub Network Connection with the first leg down.

19. The network of claim 16, wherein the control plane comprises any of Optical Signal and Routing Protocol (OSRP), Automatically Switched Optical Network (ASON), and Generalize Multi-Protocol Label Switching (GMPLS); and wherein the plurality of nodes each comprise an optical switch.

20. The switch of claim 1, wherein the Mesh Restorable Sub Network Connection Protection service is compliant to ITU-T G.841.

\* \* \* \* \*